United States Patent
Adachi et al.

(10) Patent No.: US 6,728,619 B2
(45) Date of Patent: Apr. 27, 2004

(54) FAILURE MEASURE OUTPUTTING METHOD, OUTPUT SYSTEM, AND OUTPUT DEVICE

(75) Inventors: Hiroyuki Adachi, Tsuchiurashi (JP); Toichi Hirata, Ushikushi (JP); Genroku Sugiyama, Ibaraki (JP); Hiroshi Watanabe, Ushikushi (JP); Shuichi Miura, Koshigayashi (JP); Koji Mitsuya, Kashiwashi (JP); Yoshiaki Saito, Adachi-ku (JP); Atsushi Sato, Soukashi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/979,998

(22) PCT Filed: Mar. 30, 2001

(86) PCT No.: PCT/JP01/02815
§ 371 (c)(1), (2), (4) Date: Mar. 1, 2002

(87) PCT Pub. No.: WO01/73224
PCT Pub. Date: Oct. 4, 2001

(65) Prior Publication Data
US 2003/0023325 A1 Jan. 30, 2003

(30) Foreign Application Priority Data
Mar. 31, 2000 (JP) .......................... 2000-99139

(51) Int. Cl.⁷ .................. G06R 19/00; G06R 7/70; G06G 7/00; G06G 7/76
(52) U.S. Cl. .................. 701/50; 701/23; 701/213; 700/9; 700/245; 342/357.1; 342/357.7; 702/177; 32/348
(58) Field of Search ............... 700/9, 245; 701/23, 701/50, 213; 702/177; 37/348; 342/357.1, 357.17

(56) References Cited

U.S. PATENT DOCUMENTS

| | | | |
|---|---|---|---|
| 5,704,142 A | * | 1/1998 | Stump .................. 37/348 |
| 5,848,485 A | * | 12/1998 | Anderson et al. ........ 37/348 |
| 5,970,436 A | * | 10/1999 | Berg et al. ............ 702/177 |

(List continued on next page.)

FOREIGN PATENT DOCUMENTS

| | | | |
|---|---|---|---|
| EP | 0 989 525 A2 | | 3/2000 |
| JP | B2 4-68580 | | 11/1992 |
| JP | A 5-26784 | | 2/1993 |
| JP | 05-026784 | * | 2/1993 |
| JP | A 10-46631 | | 2/1998 |
| JP | A 11-190048 | | 7/1999 |
| JP | 11-190048 | * | 7/1999 |
| JP | A 11-264747 | | 9/1999 |
| JP | 11-264747 | * | 9/1999 |

OTHER PUBLICATIONS

E–Cricular, Automation in transportation system construction and maintenence, 2000, Internet, pp. 1–27.*
Hndricks et al., Precise positioning of blasthole drills and mining shovels using GPS, 1996, IEEE, pp. 10–14.*
Henderson et al., ICFACX, An integrated circuit failure analysis expert system, 1991, IEEE, pp. 142–151.*
Benski et al., On–line process failure analysis and modeling, 1989, IEEE, pp. 431–434.*

Primary Examiner—William A. Cuchlinski, Jr.
Assistant Examiner—McDieunel Marc
(74) Attorney, Agent, or Firm—Oliff & Berridge, PLC

(57) ABSTRACT

A method for outputting failure handling method includes: detecting conditions of each part of a working machine; transmitting condition signals representing the detected conditions; receiving the condition signals; calculating a handling method for a failure showed by the received condition signals; and transmitting a handling signal representing the calculated handling method.

19 Claims, 22 Drawing Sheets

U.S. PATENT DOCUMENTS

| | | | | |
|---|---|---|---|---|
| 6,037,901 A | * | 3/2000 | Devier et al. | 342/357.17 |
| 6,047,227 A | * | 4/2000 | Henderson et al. | 701/50 |
| 6,226,572 B1 | * | 5/2001 | Tojima et al. | 701/23 |
| 6,252,544 B1 | * | 6/2001 | Hoffberg | 342/357.1 |
| 6,429,812 B1 | * | 8/2002 | Hoffberg | 342/357.1 |
| 6,516,270 B2 | * | 2/2003 | Pavlak et al. | 701/213 |
| 2002/0032511 A1 | * | 3/2002 | Murakami et al. | 701/50 |

* cited by examiner

FIG. 13

| MACHINE NUMBER | CURRENT LOCATION | HOUR METER | TRAVEL OPERATION TIME | SWIVELING OPERATION TIME | FRONT OPERATION TIME |
|---|---|---|---|---|---|
| a1 | X₁Y₁ | 1850 | 300 | 360 | 650 |
| a2 | X₁Y₁ | 2025 | 200 | 400 | 1300 |
| b1 | X₂Y₂ | 4500 | 800 | 2210 | 1000 |
| b2 | X₂Y₂ | 1000 | 100 | 200 | 600 |
| c1 | X₃Y₃ | 3450 | 400 | 500 | 1460 |
| c2 | X₃Y₃ | 2150 | 300 | 400 | 1200 |

| SERVICE CENTER | MACHINE NUMBER | | MACHINE NUMBER | |
|---|---|---|---|---|
| SF1 | a1 | ... | a2 | ... |
| SF2 | b1 | ... | b2 | ... |
| SF3 | c1 | ... | c2 | ... |

FIG.18

| COMPANY A | No.1 |
|---|---|
| MARCH 16TH, 2000 | MACHINE NO. 253 |

| ACTUAL ENGINE OPERATING TIME | |
|---|---|
| ACCUMULATIVE | 1640 HOURS |
| MARCH 15TH | 9 HOURS |
| TRAVEL OPERATION TIME | |
| ACCUMULATIVE | 115 HOURS |
| MARCH 15TH | 1 HOUR |
| SWIVELING OPERATION TIME | |
| ACCUMULATIVE | 621 HOURS |
| MARCH 15TH | 2 HOURS |
| FRONT OPERATION TIME | |
| ACCUMULATIVE | 1073 HOURS |
| MARCH 15TH | 4 HOURS |

| MAINTENANCE INFORMATION | No.2 |
|---|---|
| TIME UNTIL MAINTENANCE | |
| ENGINE OIL FILTER REPLACEMENT | 100 HOURS |
| ENGINE OIL REPLACEMENT | 60 HOURS |
| AIR FILTER REPLACEMENT | 300 HOURS |
| UNTIL GREASE UP | 160 HOURS |
| ⋮ | ⋮ |

FIG.19A

| | MAINTENANCE SCHEDULE FOR ROLLER | | |
|---|---|---|---|
| | SITE A | SITE B | SITE C |
| THIS MONTH | $a_1, a_{n-1}$ | $b_2, b_{m-5}, b_n$ | $c_3, c_5$ |
| NEXT MONTH | $a_3, a_5, a_{10}$ | $b_3$ | — |
| MONTH AFTER NEXT | — | $b_1, b_2$ | $c_1, c_2$ |

FIG.19B

| | MAINTENANCE SCHEDULE FOR BUSH | | |
|---|---|---|---|
| | SITE A | SITE B | SITE C |
| THIS MONTH | $a_2, a_5$ | $b_1$ | — |
| NEXT MONTH | — | $b_4$ | $c_2, c_4$ |
| MONTH AFTER NEXT | — | $b_{n-1}, b_5$ | $c_{n-1}, c_3$ |

FIG.19C

| | MAINTENANCE SCHEDULE FOR PIN | | |
|---|---|---|---|
| | SITE A | SITE B | SITE C |
| THIS MONTH | $a_6$ | $b_2, b_n$ | $c_4, c_6$ |
| NEXT MONTH | $a_8, a_9$ | — | $c_7, c_8$ |
| MONTH AFTER NEXT | — | $b_3, b_1$ | $c_{n-2}, c_{n-1}$ |

FIG.22

|  | SERVICE MAN SCHEDULE CHART (MARCH) | | | | | | | |
|---|---|---|---|---|---|---|---|---|
|  | 1 | 2 | 3 | 4 | 5 | 6 | 7 | 8 |
| SERVICE MAN A | ←→ |  | ←→ | ←→ |  |  |  | ←→ |
| SERVICE MAN B | ←—→ |  |  |  |  |  | ←—→ | |
| SERVICE MAN C |  | ←→ | ←——→ | |  | ←→ |  |  |

ACTUAL OPERATION TIME ANALYSIS

ACTUAL OPERATION TIME ANALYSIS

FAILURE MEASURE OUTPUTTING METHOD, OUTPUT SYSTEM, AND OUTPUT DEVICE

This application is based on Japanese Patent Application No. 2000-99139 (application date Mar. 31, 2000) and the contents of that application are hereby incorporated by reference.

TECHNICAL FIELD

The present invention relates to a method, an output system and an output device for monitoring failures in moving mechanisms and components such as an engine, hydraulic pump, hydraulic motor and the like of a working machine such as a construction machine, at a remote location, and outputting a method for handling these failures to the working machine or the like.

BACKGROUND ART

For example, a hydraulic excavator or crane (hereafter referred to as a construction machine) is made up of a number of components, and each component is susceptible to failures or faults. There are various failure conditions, and if there is a simple failure the operator can repair the construction machine, but depending on the nature of the failure the operator may not always be able to deal with it and it is necessary to contact the manufacturer's service center.

However, it is sometimes difficult to reliably communicate the nature of the failure. There are also occasions where the nature of the failure can not be understood. In such instances, a service man receiving notification of a failure will have to go to the actual site to investigate the failure. A serviceman may not be carrying all of the parts necessary for repair, and so depending on the nature of the failure it may be necessary to return to the service center and collect some parts.

DISCLOSURE OF THE INVENTION

The object of the present invention is to provide a method for outputting failure handling method, a failure handling method output system and a failure handling method output device in which the nature of a failure in a working machine such as a construction machine can be reliably determined.

In order to attain the above object, a method for outputting failure handling method according to the present invention, comprises: detecting conditions of each part of a working machine; transmitting condition signals representing the detected conditions; receiving the condition signals; calculating a handling method for a failure showed by the received condition signals; and transmitting a handling signal representing the calculated handling method.

In this method for outputting failure handling method, it is preferred that the handling signal is transmitted to any of the working machine, a service man and a manager of the working machine. In this case, it is preferred that the handling signal is transmitted together with information identifying the working machine and information indicating a nature of the failure. Or, it is preferred that when the handling signal is transmitted to the service man, a current location of the working machine is transmitted together.

A failure handling method output system according to the present invention comprises: a condition detector that is provided in a working machine and detects conditions of each part of the working machine; a working machine side transmitter that is provided in the working machine and transmits condition signals representing the conditions detected by the condition detector; a working machine monitoring side receiver that is provided in a working machine monitoring facility and receives the condition signals transmitted from the working machine side transmitter; a handling method calculating device that is provided in the working machine monitoring facility and calculates a handling method for a failure shown by the condition signals received by the working machine monitoring side receiver; a working machine monitoring side transmitter that is provided in the working machine monitoring facility and transmits a handling signal representing the calculated handling method; and a working machine side receiver that is provided in the working machine and receives the transmitted handling signal.

In this failure handling method output system, it is preferred that a monitor that displays the handling method based on the handling signal received by the working machine side receiver, is further provided.

Also, it is preferred that the handling method calculating device calculates the handling method by searching a database using the condition signals received by the working machine monitoring side receiver.

A failure handling method output device according to the present invention comprises: a receiver that receives condition signals representing conditions of each part of a working machine transmitted from the working machine; a handling method calculating device that calculates a handling method for a failure shown by the received condition signals; and a transmitter that transmits a handling signal representing the calculated handling method.

A method for outputting failure handling method according to the present invention comprises: receiving condition signals representing conditions of each part of a working machine transmitted from the working machine; calculating a handling method for a failure shown by the received condition signals; and transmitting a handling signal representing the calculated handling method.

Another failure handling method output device according to the present invention receives condition signals representing conditions of each part of a working machine transmitted from the working machine, calculates a handling method for a failure shown by the received condition signals, and transmits a handling signal representing the calculated handling method.

In the above methods for outputting failure handling method, it is preferred that transmission and reception of the condition signals, and transmission of the handling signal, are carried out via a communications satellite.

In the above methods for outputting failure handling method, it is preferred that transmission and reception of the condition signals, and transmission of the handling signal, are carried out via a mobile communications system.

A failure information acquisition method according to the present invention comprises: outputting information, relating to items to be checked when a failure occurs in a working machine, to a mobile communications terminal via a mobile communications system; receiving information, which has been input at the mobile communications terminal regarding the items to be checked, via the mobile communications system; and storing the received information in a storage device as failure information.

BRIEF DESCRIPTION OF THE DRAWINGS

FIG. 13 is a figure for describing data arranged by hydraulic excavator number.

FIG. 18 is a figure showing an example of a daily report output at the service center FIG. 19A–FIG. 19C are figures showing one example of a maintenance schedule output at the service center.

FIG. 20A and FIG. 10B are figures showing traveling load frequency distribution and digging load frequency distribution.

FIG. 22 is a figure showing a serviceman schedule table.

BEST MODE FOR CARRYING OUT THE INVENTION

Figure 1:
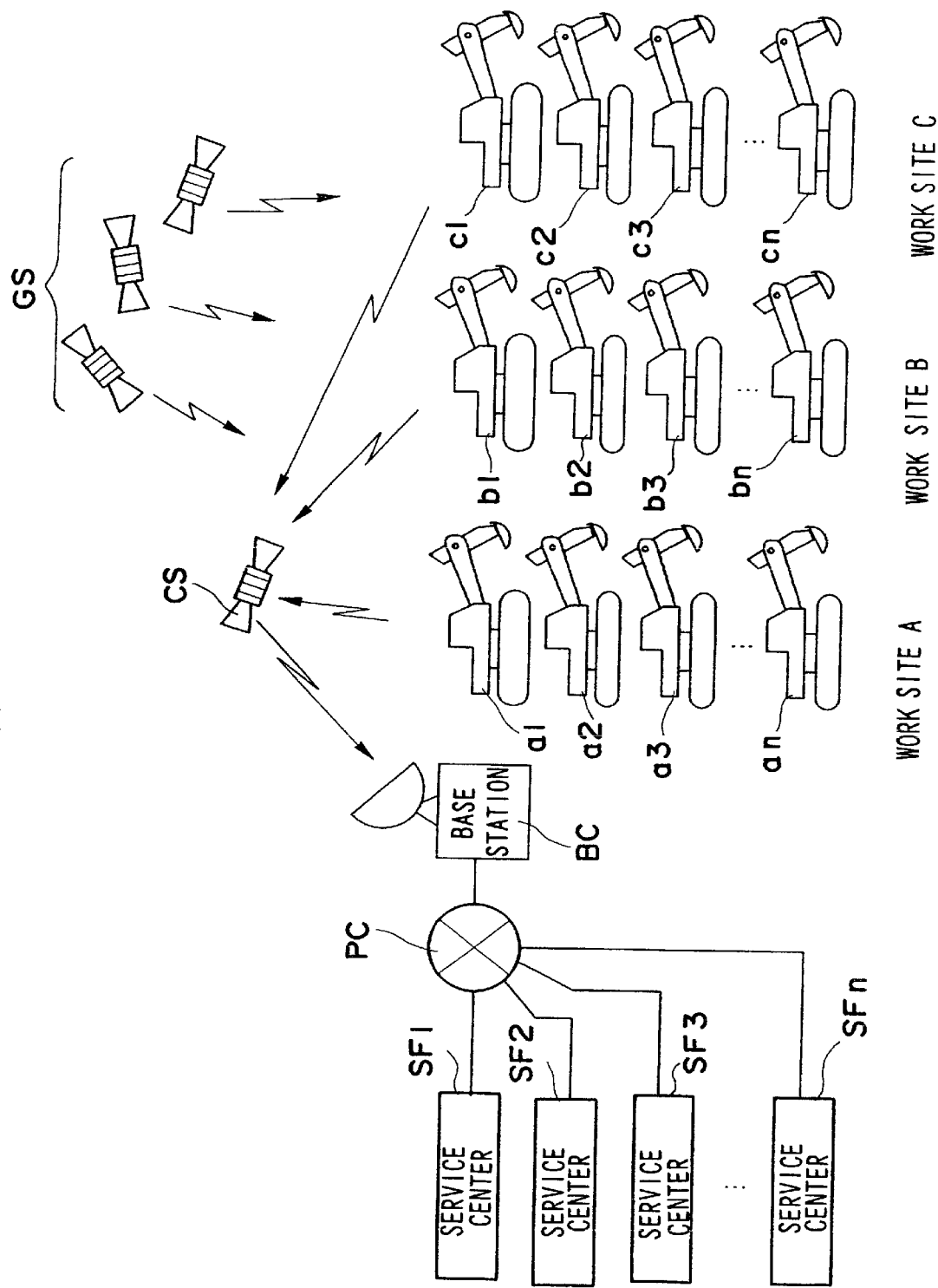
FIG. 1 is a figure showing an operating state of a hydraulic excavator to which a field service schedule creation method according to the present invention is applied.

Using FIG. 1–FIG. 24, the case of applying the present invention to a method of outputting a failure handling method (measures for failure) for a hydraulic excavator will now be described. FIG. 1 is a figure showing an operating state of a hydraulic excavator to which a method for outputting failure handling method according to the present invention is applied.

Specifically, a plurality of hydraulic excavators are respectively operating in a plurality of work sites (work areas) A, B and C. Hydraulic excavators a1–an are operating at site A, hydraulic excavators b1–bn are operating at site B, and hydraulic excavators c1–cn are operating at site C. The sites A, B and C are not the same work site and are separated geographically. With this embodiment, the state of each part of each hydraulic excavator is detected, and a detected signal is transmitted to the base station BC through a communications satellite CS. The base station BC transmits a received signal to suitable service centers SF1–SFn using a general public telephone network PC. At the service centers SF1–SFn, a daily report which will be described later is created, failures are diagnosed, and field service schedules are created, based on received signals. Each hydraulic excavator is fitted with a GPS receiver, and can calculate its current position by receiving a signal from a GPS satellite GS. The current position information is transmitted, together with a signal for each part of the hydraulic excavator, through the base station BC to the service center SF, and the service center SF can confirm the operating location of each of the hydraulic excavators.

Figure 2:
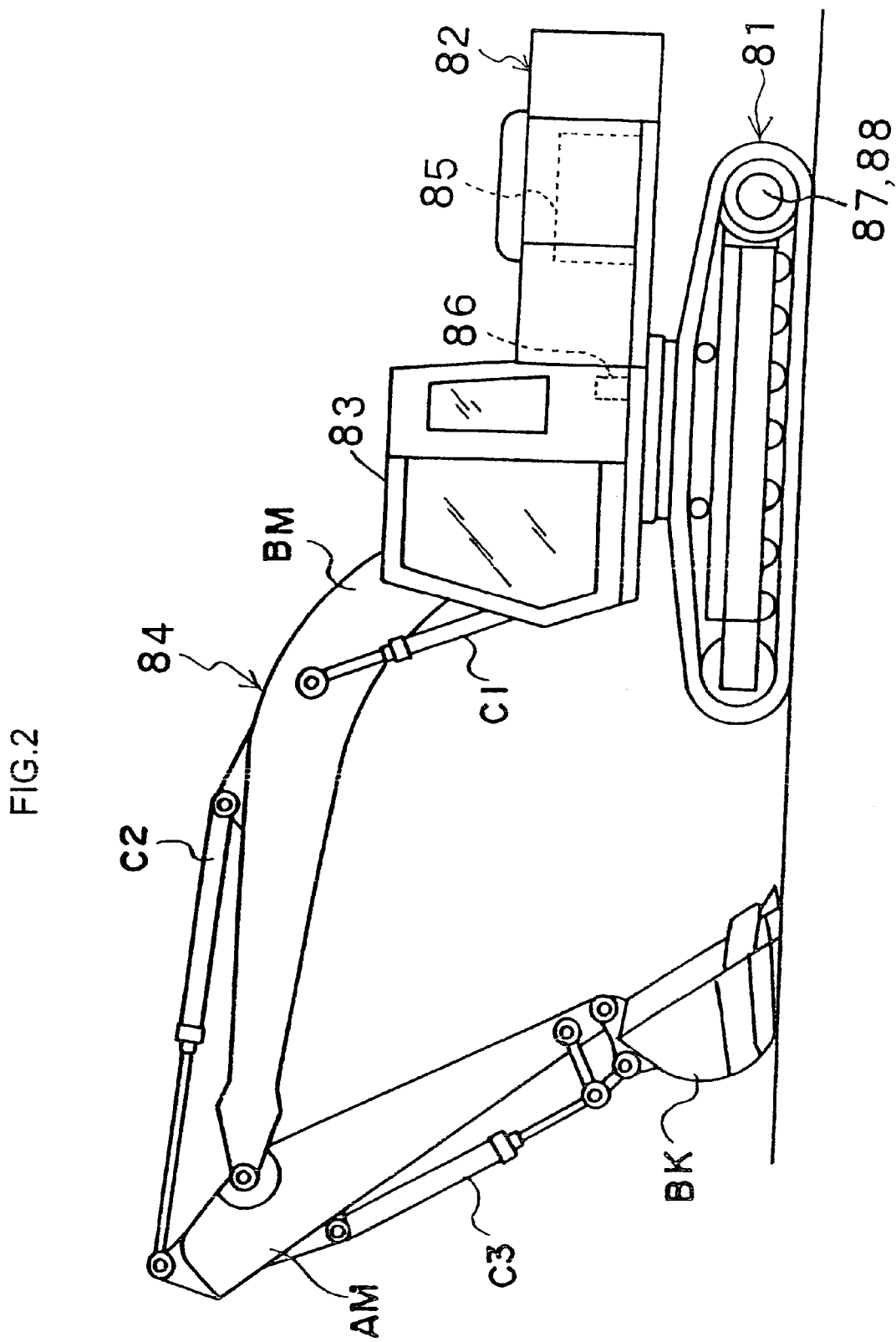
FIG. 2 is a figure showing one example of a hydraulic excavator.

A hydraulic excavator is constructed as shown in FIG. 2. The hydraulic excavator has an travelling body 81, and a swiveling body 82 connected to an upper part of the travelling body 81 so as to be capable of swiveling or swiveling. An operators cabin 83, an operation section 84, an engine 85 and a swivel motor 86 are provided in the swiveling body 82. The operation section 84 comprises a boom BM attached to the main body of the swiveling body 82 so as to be capable of rotation, an arm AM rotatably linked to the boom BM, an attachment, which is a bucket BK for example, rotatably linked to the arm AM. The boom BM is raised and lowered by a boom cylinder C1, the arm AM is made to perform crowd and dump operations using an arm cylinder C2, and the bucket Bk is made to perform crowd and dump operations using the bucket cylinder C3. Left and right hydraulic travel motors 87 and 88 are provided in the travelling body 81.

Figure 3:
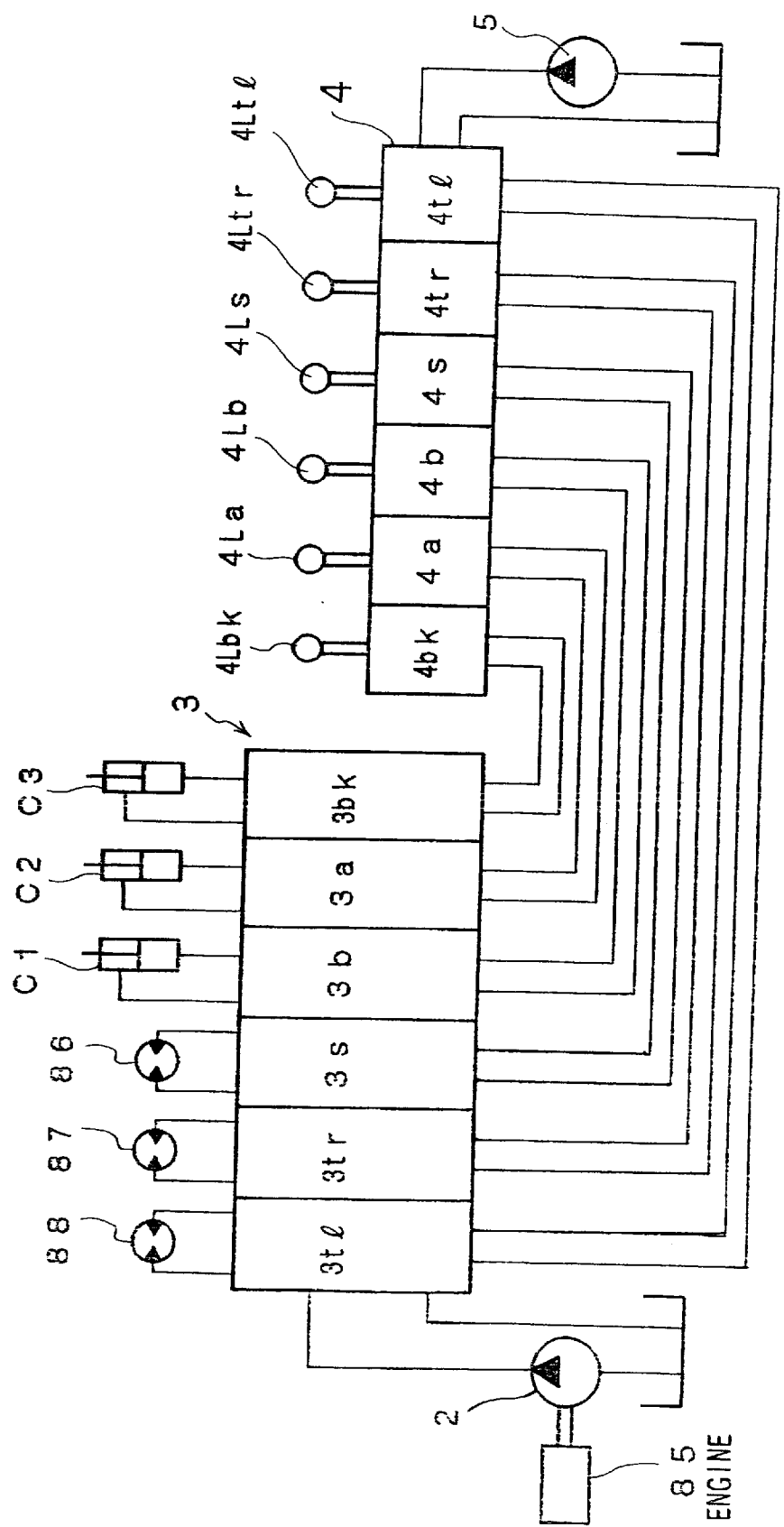
FIG. 3 is a figure showing an example of the hydraulic circuits of a hydraulic excavator.
Figure 4:
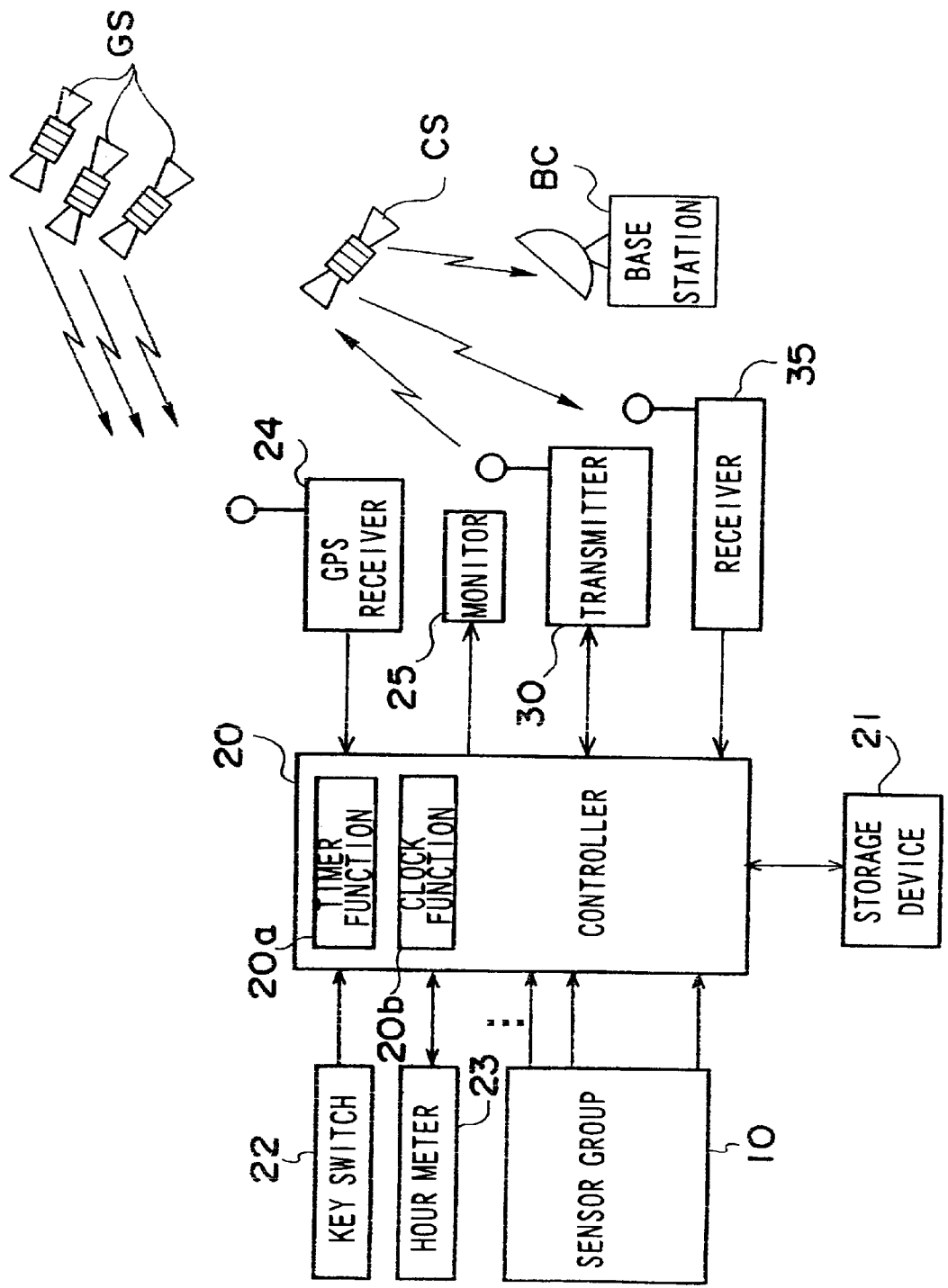
FIG. 4 is a block diagram showing the structure of a controller for a hydraulic excavator.

FIG. 3 schematically shows the hydraulic circuits of the hydraulic excavator. The engine 85 drives the hydraulic pump 2. Hydraulic fluid discharged from this hydraulic pump 2 is controlled as to its direction and amount by a plurality of control valves 3s, 3tr, 3tl, 3b, 3a and 3bk, and drives the above described swivel hydraulic motor 86, left and right travel hydraulic motors 87 and 88, and the hydraulic cylinders C1, C2 and C3. The plurality of control valves 3s, 3tr, 3tl, 3b, 3a and 3bk are switched respectively by pilot pressure provided from pilot valves 4s, 4tr, 4tl, 4b, 4a and 4bk. The pilot valves 4s, 4tr, 4tl, 4b, 4a and 4bk have pilot hydraulic fluid at a specified pressure supplied from a pilot valve hydraulic pump 5, and output pilot pressure according to an amount of actuation of actuation levers 4Ls, 4Ltr, 4Ltl, 4Lb, 4La and 4Lbl. The plurality of control valves 3s, 3tr, 3tl, 3b, 3a and 3bk are collected together in a single valve block. The plurality of control valves 3s, 3tr, 3tl, 3b, 3a and 3bk are also collected together in a single block FIG. 4 is a block diagram of a controller for detecting and transmitting states of each of the parts of the hydraulic excavator. A sensor group 10 having a plurality of sensors for detecting the state of each of the parts, as described above, is mounted in the hydraulic excavator, and state detection signals output from the sensor group 10 are read into a controller 20 at a specified timing. The controller 20 has a timer function 20a for calculating travel operation time, swiveling operation time and front (excavation) operation time. The controller 20 calculates travel operation time, swiveling operation time and front (excavation) operation time based on read out state detection signals. These calculated operation times are stored in a storage device 21. The hydraulic excavator also comprises a key switch 22 for activating the engine 85, and an hour meter 23 for measuring actual operational time of the engine 85.

A GPS receiver 24 is mounted in the hydraulic excavator. The GPS receiver 24 receives GPS signals from a GPS satellite GS, and calculates and outputs positional information to the controller 20 based on the GPS signals. A monitor 25 for displaying various information is provided in the drivers seat of the hydraulic excavator.

The controller 20 has the timer function 20b, and is capable of recognizing the times at which the key switch 22 is turned on and off, and the times at which the engine is started and stopped. These times are also stored in the storage device 21. Measurement values of the hour meter 23 are also read into the controller 20 at a specified timing, and stored in the storage device 21. The traveling, swiveling and front operation times, and a time when the key switch is turned on, etc. stored in the storage device 21 are transmitted at a specified timing through a transmitter 30. Radio waves from the transmitter 30 are received by the base station BC through the satellite CS. A receiver 35 is also connected to the controller 20. The receiver 35 receives signals of a handling method at the time of a failure transmitted from the service center SF through the communications satellite CS and the base station BC, and transmits these signals to the controller 20. The controller 20, transmitter 30 and receiver 35 are in an operable state even if the main switch of the hydraulic excavator is turned off, being powered from a vehicle mounted battery.

Figure 5:
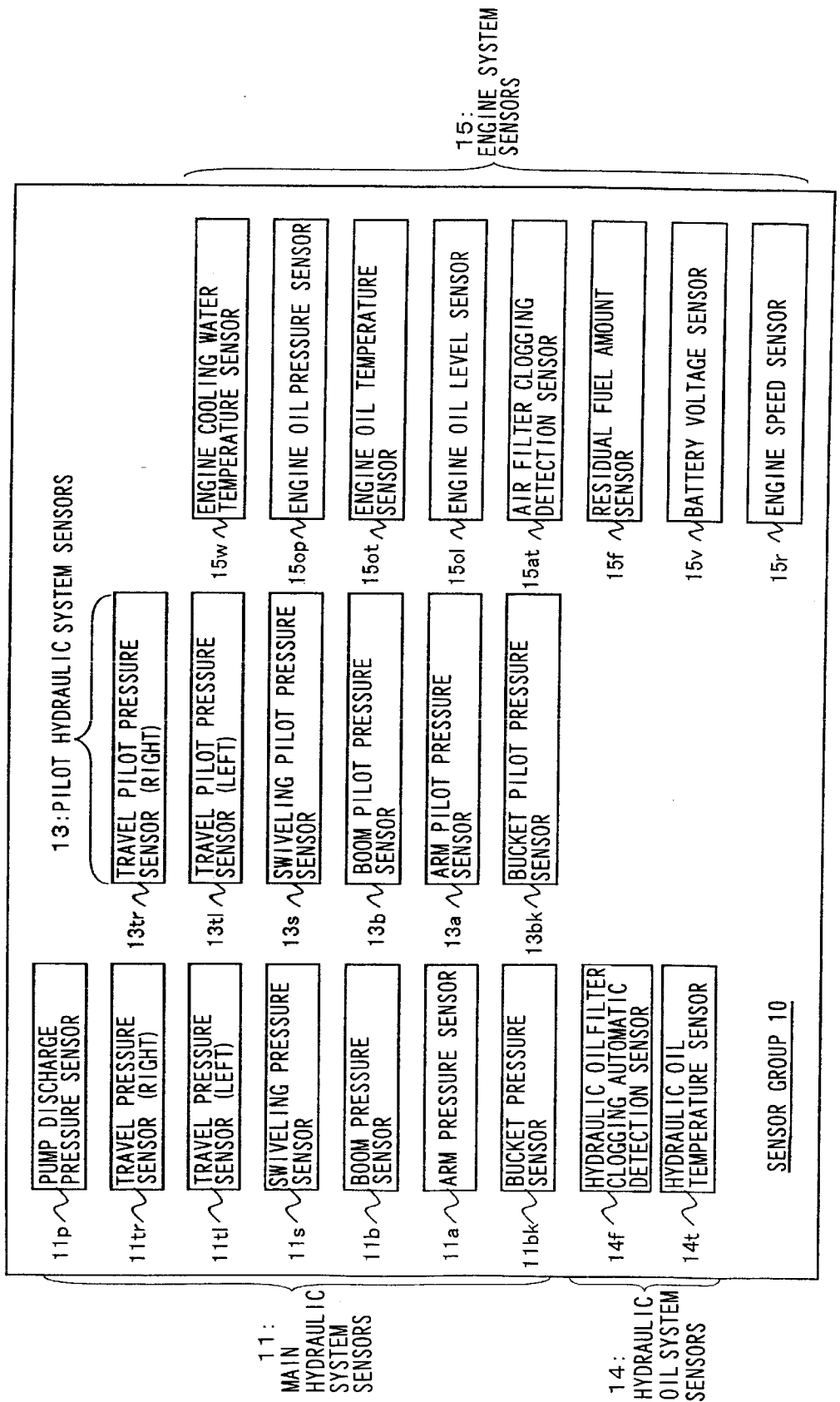
FIG. 5 is a figure for describing a group of a hydraulic excavator sensors in detail.

As shown in FIG. 5, the sensor group 10 is provided with pressure sensors 11 for detecting pressurized states of the main hydraulic circuits system. Specifically, there are provided a pressure sensor 11p for measuring discharge pressure of the hydraulic pump 2, pressure sensors 11tr and 11tl for measuring drive pressure of the travel hydraulic motors 87 and 88, a pressure sensor 11s for measuring drive pressure of the swiveling hydraulic motor 86, a pressure sensor 11b for measuring drive pressure of the boom hydraulic cylinder C1, a pressure sensor 11a for measuring drive pressure of the arm hydraulic cylinder C1, and a pressure sensor 11bk for measuring drive pressure of the bucket hydraulic cylinder C3.

The sensor group 10 is also provided with pressure sensors 13 for detecting pressure states of the pilot hydraulic circuit system. Specifically, there are pressure sensors 13tr and 13tl for measuring pilot pressure Ptr and Ptl output from the traveling hydraulic pilot valves 4tr and 4tl, a pressure sensor 13s for measuring pilot pressure Ps output from the swiveling hydraulic pilot valve 4s, a pressure sensor 13b for measuring pilot pressure Pb output from the boom hydraulic pilot valve 4b, a pressure sensor 13a for measuring pilot pressure Pa output from the arm hydraulic pilot valve 4b, and a pressure sensor 13bk for measuring pilot pressure Pbk output from the bucket hydraulic pilot valve 4bk.

The travel operating time is a time accumulated when pressures Ptr or Ptl detected by the travel pilot pressure sensors 13tr and 13tl are above a specified value. The swiveling operating time is a time accumulated when pressure Ps detected by the swiveling pilot pressure sensor 13s is above a specified value. The front operating time is a time accumulated when pressure Ps, Pa or Pbk detected by the pressure sensors 13b, 13a and 13bk for the boom, arm or bucket are above a specified value.

The sensor group 10 is also provided with a pressure sensor 14f for detecting clogging of a filter provided in the main hydraulic line, and a temperature sensor 14t for detecting the temperature of hydraulic oil for driving the hydraulic motors and the hydraulic cylinders. The sensor group 10 also has various sensors 15 for detecting conditions within the engine system. Specifically, there are a cooling water temperature sensor 15w for detecting the temperature of cooling water in the engine 85, an engine oil pressure sensor 15op for detecting the pressure of the engine oil, an engine oil temperature sensor 15ot for detecting the temperature of the engine oil, an engine oil level sensor 15ol for detecting the level of the engine oil, a clogging sensor 15af for detecting clogging of an air filter, a residual fuel amount sensor 15f for measuring a residual fuel amount, a battery voltage sensor 15v for detecting the charge voltage of a battery, and a rotational speed sensor 15r for detecting the rotational speed of the engine.

As described above, signals representing the condition of each part of the hydraulic excavator are transmitted through the communications satellite CS and the base station to the service center SF, but signals representing a normal condition of each part are collected together for one day and transmitted as daily report data in a time period late at night when the communication charge is cheap. Signals representing alarms and failures etc. are transmitted each time when they are generated When the residual fuel amount becomes less than a specified value, information representing this is transmitted immediately with no restriction on the time period.

The above described daily report data is made up of the following information, and stored in the storage device 21 in a specified format.
① Time when the key switch 22 is turned on.
② Time when the key switch 22 is turned off.
③ Time when the engine is started.
④ Time when the engine is stopped.
⑤ Measured value of hour meter 23.
⑥ Traveling operation time (refer to FIG. 18).
⑦ Swiveling operation time (refer to FIG. 18).
⑧ Front operation time (refer to FIG. 18).
⑨ Engine operation time (refer to FIG. 18).
Load frequency distribution (refer to FIG. 20A), excavation load frequency distribution (refer to FIG. 20B), or amount of fuel consumption (per unit time, during actual work, under no load, etc.) are also included as daily report data.

The following are examples of alarm data.
① Engine oil level.
② Engine cooling water temperature.
③ Engine oil temperature.
④ Air filter clogged.
⑤ Hydraulic oil filter.
⑥ Battery voltage.
⑦ Engine oil pressure.
⑧ Residual Fuel amount.
⑨ Hydraulic oil temperature.
The following are failure data.
① Engine speed abnormal.
② Hydraulic pump discharge pressure abnormal.

Figure 6:
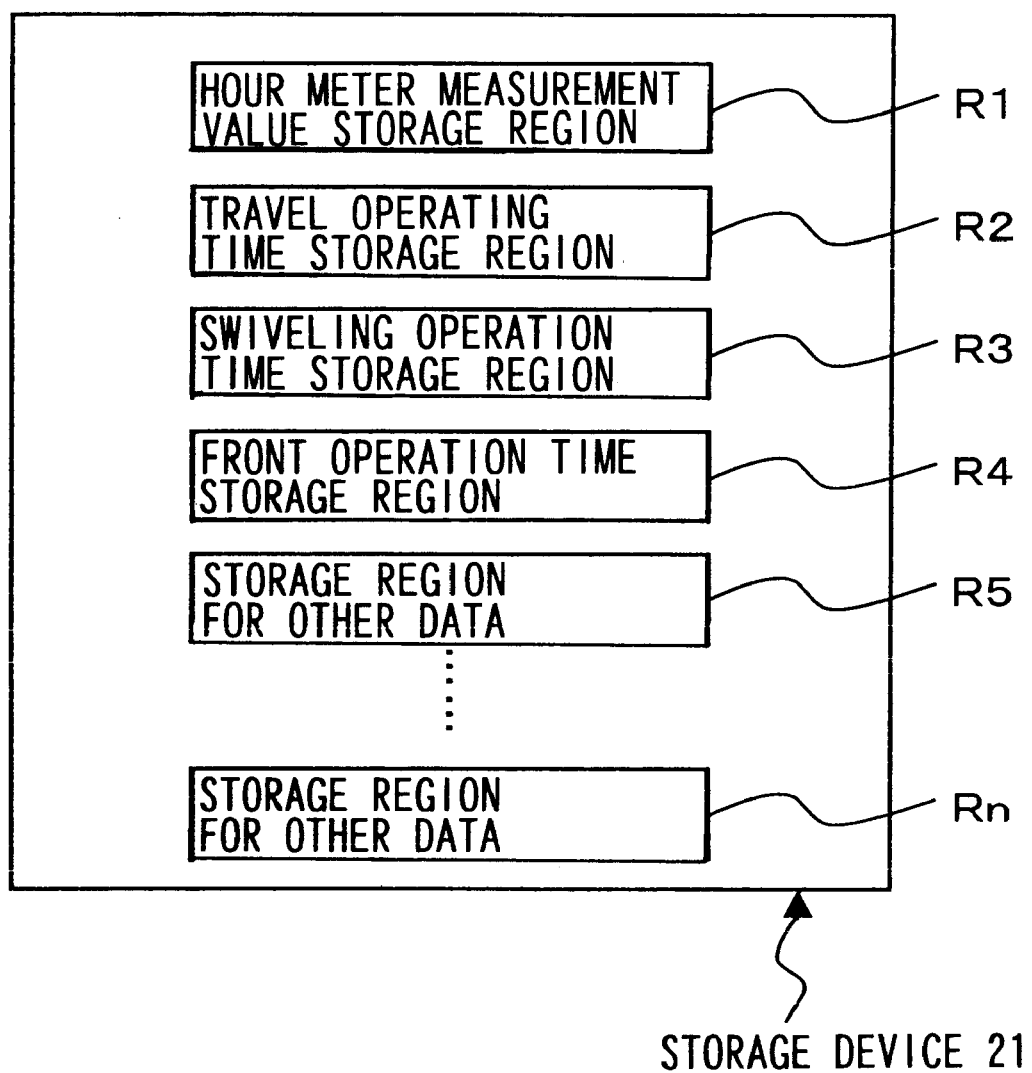
FIG. 6 is a figure for describing a storage device of a hydraulic excavator.

FIG. 6 is a figure showing one example of a storage device 21. The storage device 21 contains a first region R1 for storing measurement values of the hour meter 23 of the engine 85, a second region R2 for storing traveling operation time (time actually spent traveling), a third region R3 for storing swiveling operation time (time actually spent swiveling), a fourth region R4 for storing front operation time (actual time spent front operation), and a plurality of regions R5 to Rn for storing other condition signals, alarm signals or failure signals.

Figure 7:
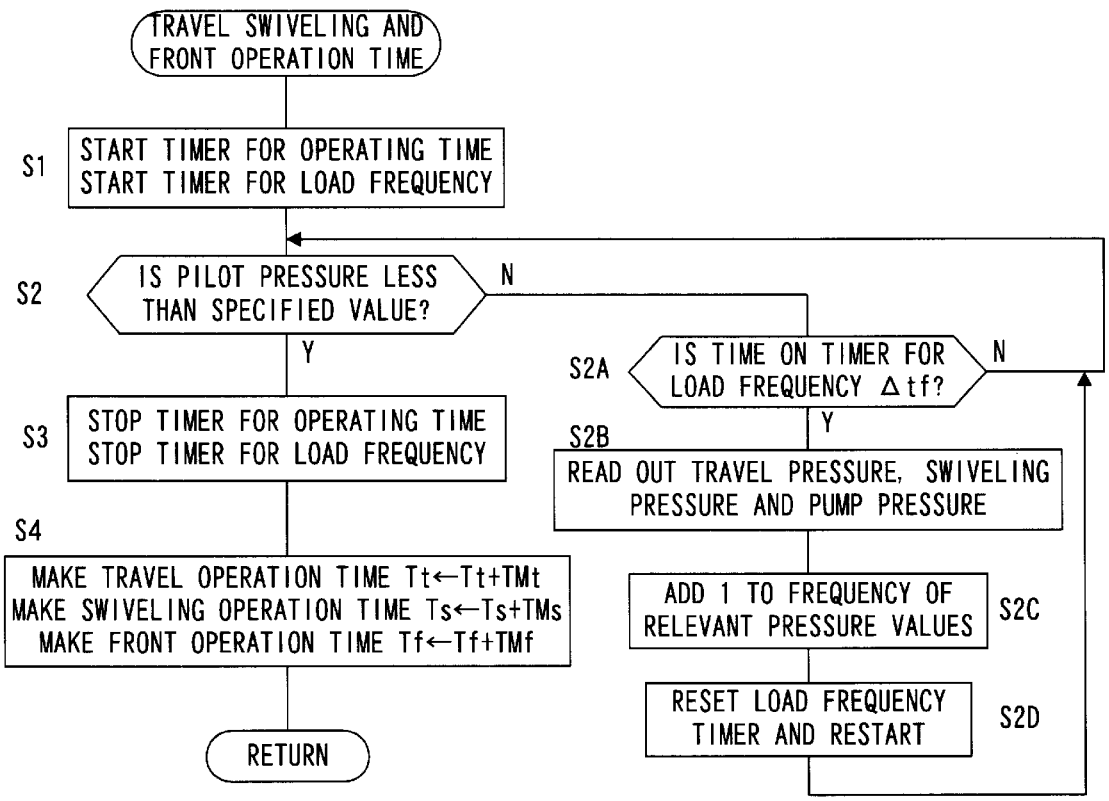
FIG. 7 is a flowchart showing an example of a procedure for calculating traveling operation time etc.

FIG. 7 is a flow chart showing a processing sequence for calculating the traveling, swiveling and front operation times executed by the controller 20 of the hydraulic excavator. For example, if either of traveling pilot pressure Ptr and Ptl, swiveling pilot pressure Ps, boom pilot pressure Pb, arm pilot pressure Pa or bucket pilot pressure Pbk become higher than a specified value, the controller 20 starts the program shown in FIG. 7. Then, in step S1, a corresponding timer for measuring the operation time is started, from among timer functions 20a for traveling, swiveling and fronting. A timer for measuring load frequency distribution is also started. Specifically, if the traveling pilot pressure Ptr or Ptl are greater than a specified value, a timer for traveling operation time is started. If the swiveling pilot pressure Ps is greater than a specified value, a timer for swiveling operation time is started, and either of the boom pilot pressure Pb, arm pilot pressure Pa or bucket pilot pressure Pbk is greater than a specified value, a timer for front operation time is started. In step S2, if it is determined that pilot pressure has become less than the specified value, processing advances to step S3, and the corresponding timer is stopped.

If the traveling operation time is taken to be Tt, the swiveling operation time is taken to be Ts, the front operation time is taken to be Tf, the time measured by the traveling timer is taken to be TMt, the time measured by the swiveling timer is taken to be TMs, and the time measured by the front timer to be TMf, the following equations are computed in step S4.

$$Tt=Tt+TMt$$

$$Ts=Ts+TMs$$

$$Tf=Tf+TMf$$

Specifically, the times measured by the timers are added to current values in respective operation time storage regions, and the operation time regions are updated with the results of addition.

Here, operating times have been measured for traveling, swiveling and front operation, but in the case where the hydraulic excavator is provided with another attachment such as a breaker, it is possible to detect the operating time for that attachment and similarly measure the attachment operating time.

Figure 20A:
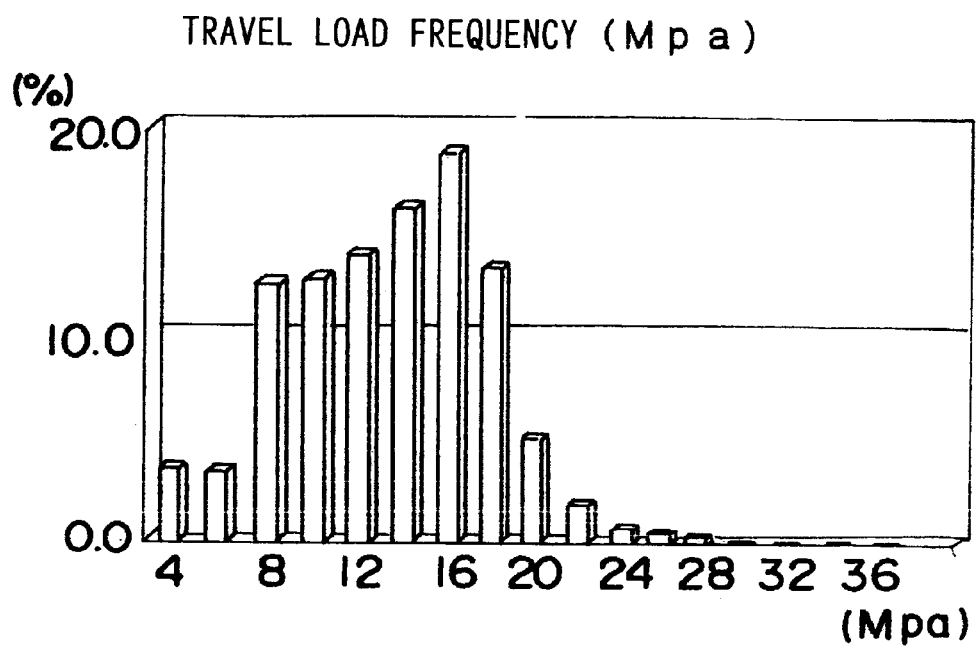
Figure 20B:
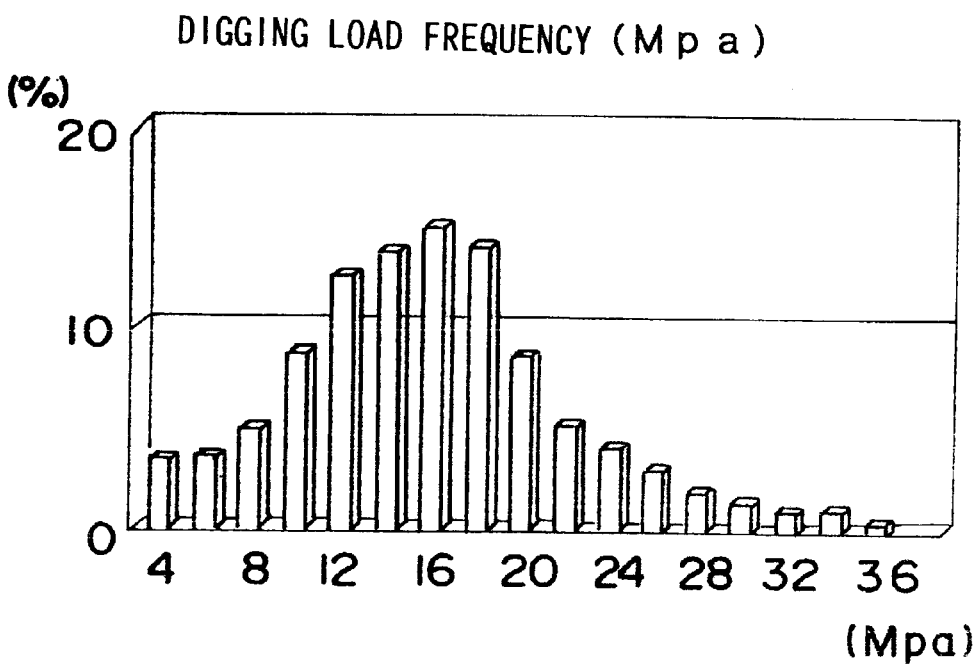

In the event that pilot pressure is greater than a specified value, the result is negative in step S2 and processing proceeds to step S2A. Then, in step S2A, if a timer for measuring load frequency distribution measures Δtf, processing advances to step S2B. In step S2B, the traveling pressure, swiveling pressure and pump pressure at that time are read out, and in step S2C, 1 is added to the histogram of the appropriate pressure value. For example, if traveling pressure is 10 Mpa, 1 is added to the frequency for 10 Mpa. In step S2D a load frequency distribution timer is reset and restarted, and processing returns to step S2.The traveling load frequency distribution is shown in FIG. 20A, and the digging load frequency distribution is shown in FIG. 20B.

Figure 8:
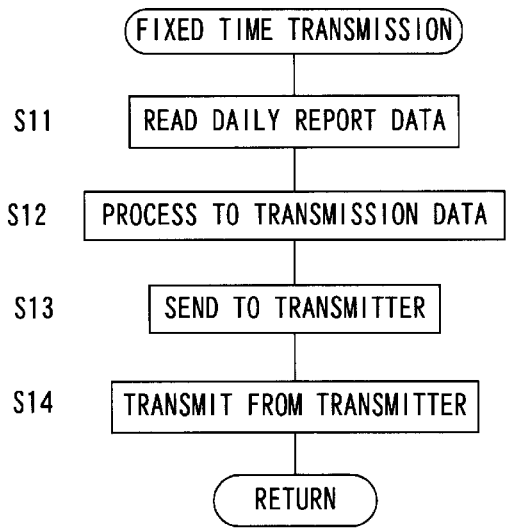
FIG. 8 is a flowchart showing fixed time transmission processing flow for a hydraulic excavator.

FIG. 8 is a flowchart showing processing flow for transmitting daily report data at a fixed and regular timing. Once a predetermined transmission time is reached, the controller 20 starts the program shown in FIG. 8. In step 11, daily report data to be transmitted is read out from the storage device 21. The read out daily report data is processed into specified transmission data in step S12, and sent to the transmitter 30 in step S13. In this way, the transmitter 30 transmits daily report data representing actual operating conditions of the hydraulic excavator for one day to the service center SF via the communications satellite CS and the base station BC (step S14).

Figure 9:
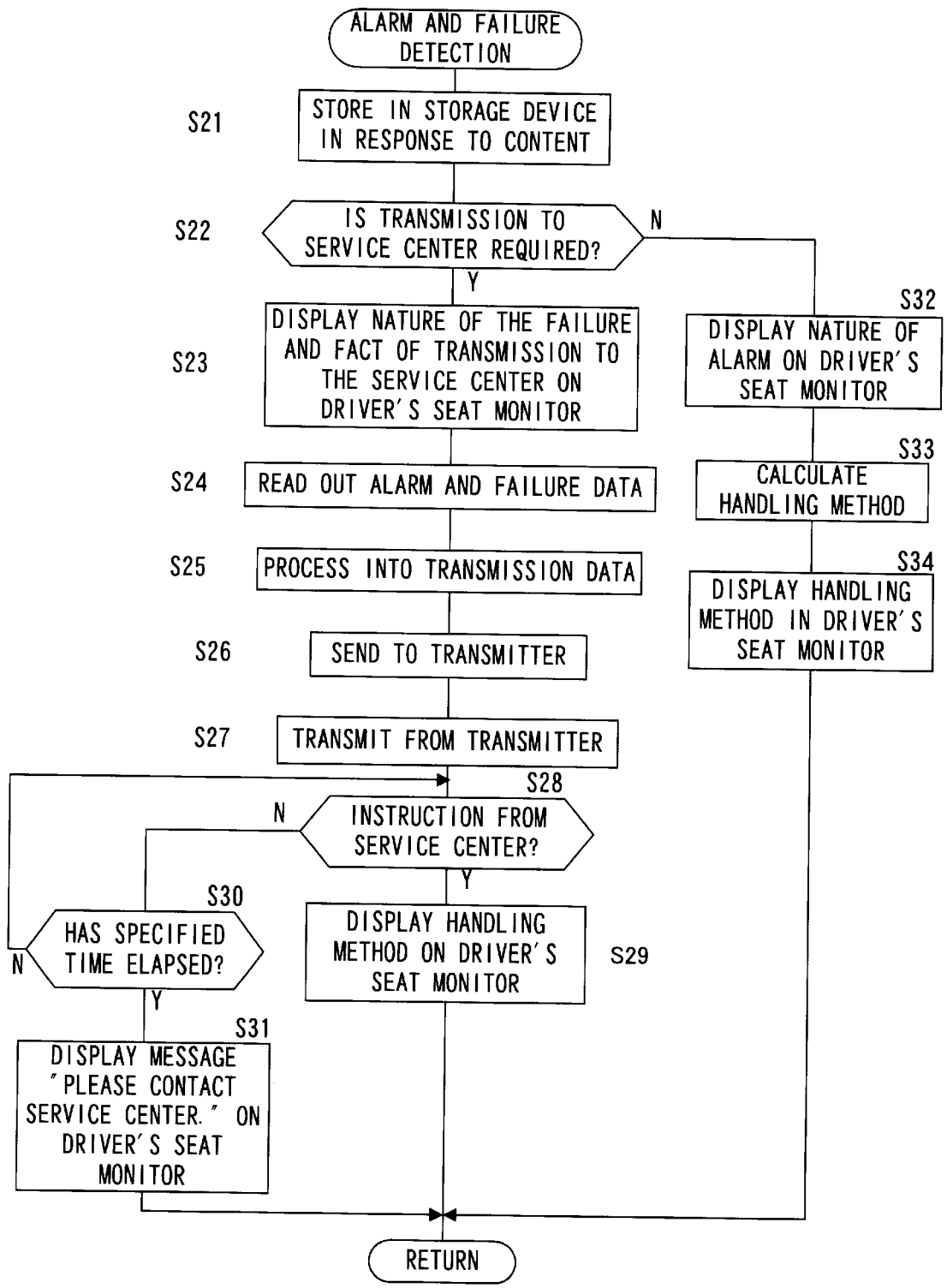
FIG. 9 is a flowchart showing an example of processing flow for a hydraulic excavator for detecting alarms or failures.

FIG. 9 is a flowchart showing processing flow for transmitting alarm signals and failure signals. If the controller 20 judges output of the above described alarm signals or failure signals, the program shown in FIG. 9 is started. In step S21, detected alarm signals and failure signals are stored in the storage device 21. If it is judged in step S22 that it is necessary to transmit these alarm signals and failure signals to the service center, processing advances to step S23. In step S23, the nature of a failure is displayed on a monitor in the drivers seat, and a fact that it is transmitted to the service center is also displayed. In step S24, alarm signals or failure signals are read out from the storage device 21, and processed into transmission data in step S25. The processed transmission data is output to the transmitter 30 in step S26, and in step S30 alarm signals or failure signals are transmitted from the transmitter 30.

If the controller 20 judges that a signal indicating a handling method for the failure has been received from the service center in step S28, the method of handling the failure is displayed in the driver's seat monitor in step S29. In the event that no indication is received from the service center, in step S30 it is judged, after transmission of alarm signals and failure signals, if a specified time has elapsed. If the specified time has elapsed, then in step S31 a message "Please contact the service center." is displayed. If the result at step S30 is negative, processing for step S28 is repeated. Specifically, in the event that there is no transmission of indication of a handling method from the service center, even when the specified time has elapsed, there is a high possibility that communication has failed for some reason, and so the operator is informed to contact the service center by telephone.

If it is judged in step S22 that it is not necessary to transmit detected alarm signals to the service center, alarm content corresponding to the alarm signals is displayed in the driver's seat monitor 25 in step S32, and in step S33 a method of handling that failure is calculated. For example, if handling methods for alarm signals are previously made into a database in the storage device 21, a handling method is calculated by accessing the database using the alarm signals. Then in step S34, the handling method is displayed on the driver's seat monitor 25.

Figure 10:
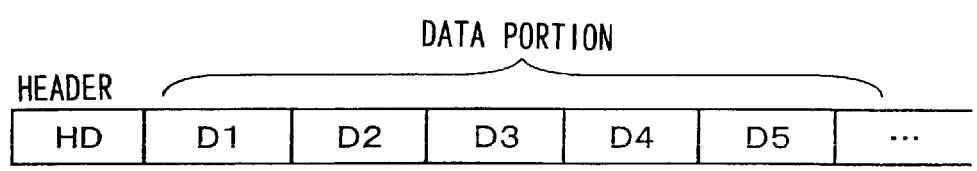
FIG. 10 is a figure showing one example of data transmitted from a hydraulic excavator.

FIG. 10 shows one example of a data string created for transmission of daily report data, alarm signal data or failure signal data. An identifier HD for identifying a hydraulic excavator is provided in a header of the data string. A data portion follows on from the header, in which current location information D1, hour meter measurement time information D2, actual travel operation time D3, actual swiveling operation time D4, and actual front operation time D5 . . . are sequentially combined.

Figure 11:
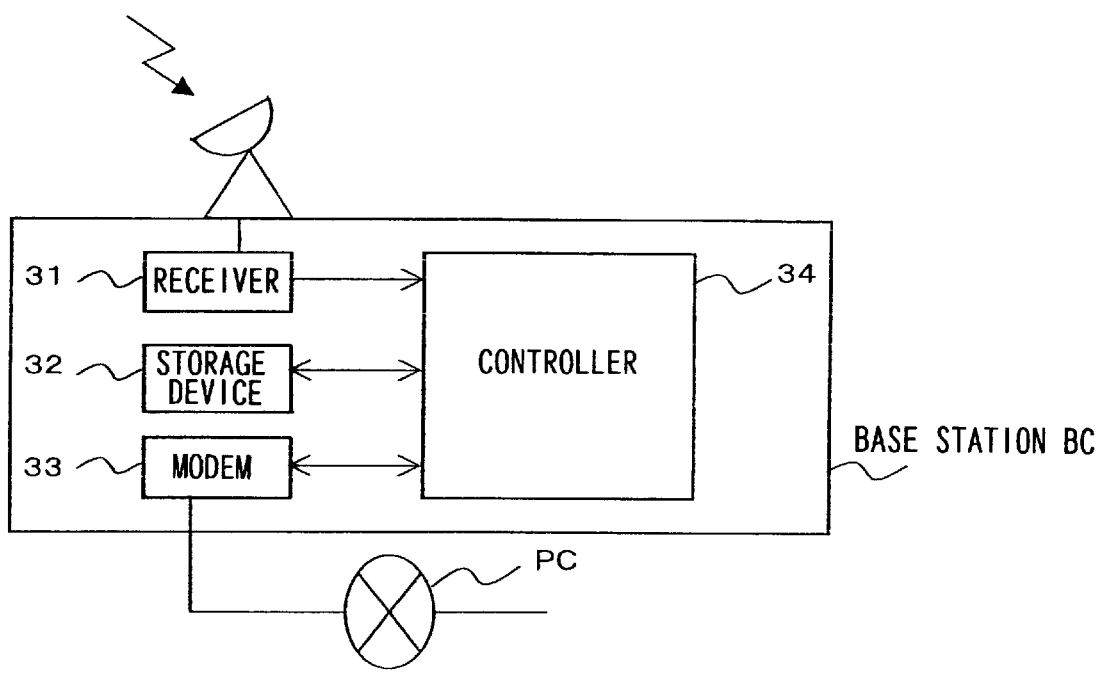
FIG. 11 is a block diagram showing the structure of a base station.

FIG. 11 is a block diagram showing the structure of a base station BC. The base station BC receives various types of signals and transmits them to service centers at various places. The base station BC is comprised of a receiver 31 for receiving signals transmitted from a communications satellite CS, a storage device 32 for storing signals received by the receiver 31, a modem 33 for transmission of data to be transmitted to the service station through a general public telephone network PC, and a controller 34 for controlling these various devices.

Figure 12:
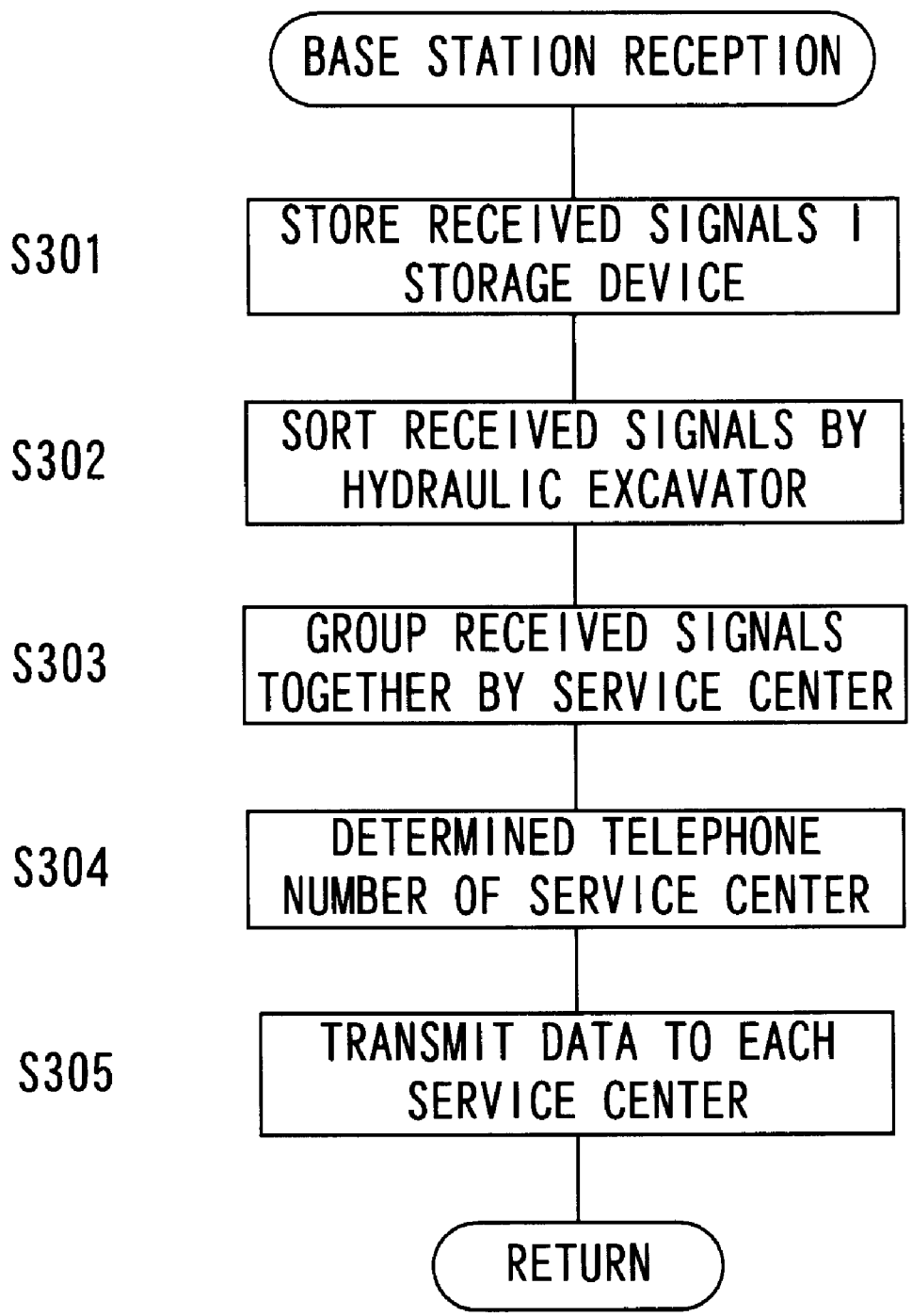
FIG. 12 is a flowchart showing processing flow in a base station.
Figures 14, 15:
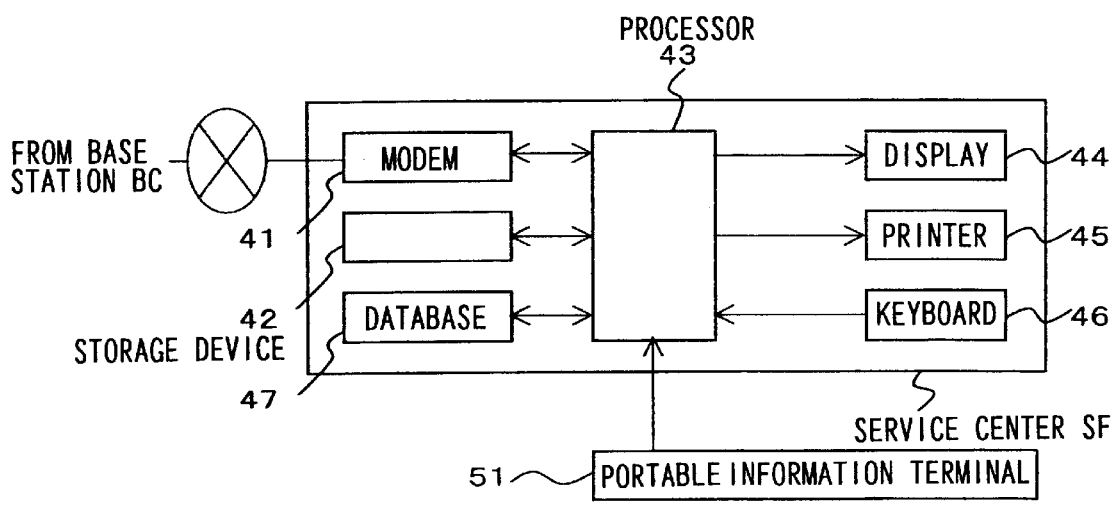
FIG. 14 is a figure for describing data organized by service center.
FIG. 15 is a block diagram of information management for a service center.

FIG. 12 is a flowchart showing processing flow for receipt of condition signal etc. by a base station BC and transmission to a service center. If signals are received from the communications satellite CS, the controller 34 of the base station BC starts the program shown in FIG. 12. In step S301, received signals are temporarily stored in the storage device 32. In step S302, a hydraulic excavator is identified from the identifier HD stored in the header of the received condition signal, and received signals are sorted for each hydraulic excavator, as shown in FIG. 13. In step S303, a service center in charge is identified based on the identified hydraulic excavator (based on the identifier), and received signals for hydraulic excavators are collected together for each service center, as shown in FIG. 14. In step S304, telephone numbers of identified service centers are read out from a database created in advance in the storage device 32, and in step S305 signals grouped together in step S303 are transmitted to each service center through the modem 33.

Received signals may be transmitted to the service center that is closest to the current location of the hydraulic excavator. Also, transmission of various information from the base station BC to each service center SF may be performed over a dedicated line or a LAN connection. For example, if the base station BC and the service center SF are facilities of the manufacturer of the hydraulic excavator, the various information can be sent using a so-called in-house LAN (intranet).

FIG. 15 is a block diagram of information management in a service center SF. The service center SF comprises a modem 41 for receiving data sent from the base station BC through a general public telephone network PC, a storage device 42 for storing signals received by the modem 41, a processor 43 for executing various computations, a display 44 and a printer 45 connected to the processor 43, and a keyboard 46. The processor 43 creates a daily report based on condition or state signals (daily report data) stored in the storage device 42, executes computation for graphical display of load frequency distribution calculated by the controller 20 of the hydraulic excavator, calculates a maintenance time for each hydraulic excavator, determines whether there are failures or abnormalities, and creates a field service schedule.

A database 47 is also connected to the processor 43. A maintenance history of the hydraulic excavator, a history of previous failures and abnormalities, and a service history, etc. are stored in this database 47. Data built up in the database 47 includes data acquired from the storage device 21 of the hydraulic excavator by a service man, who was in a field for the field service, using a portable information terminal 51.

The portable information terminal 51 is also preferably provided with a communication function. In that case, a service man inputs various information using keys of the portable information terminal 51, and the various data can be input to the database 47 using communication.

Figure 16:
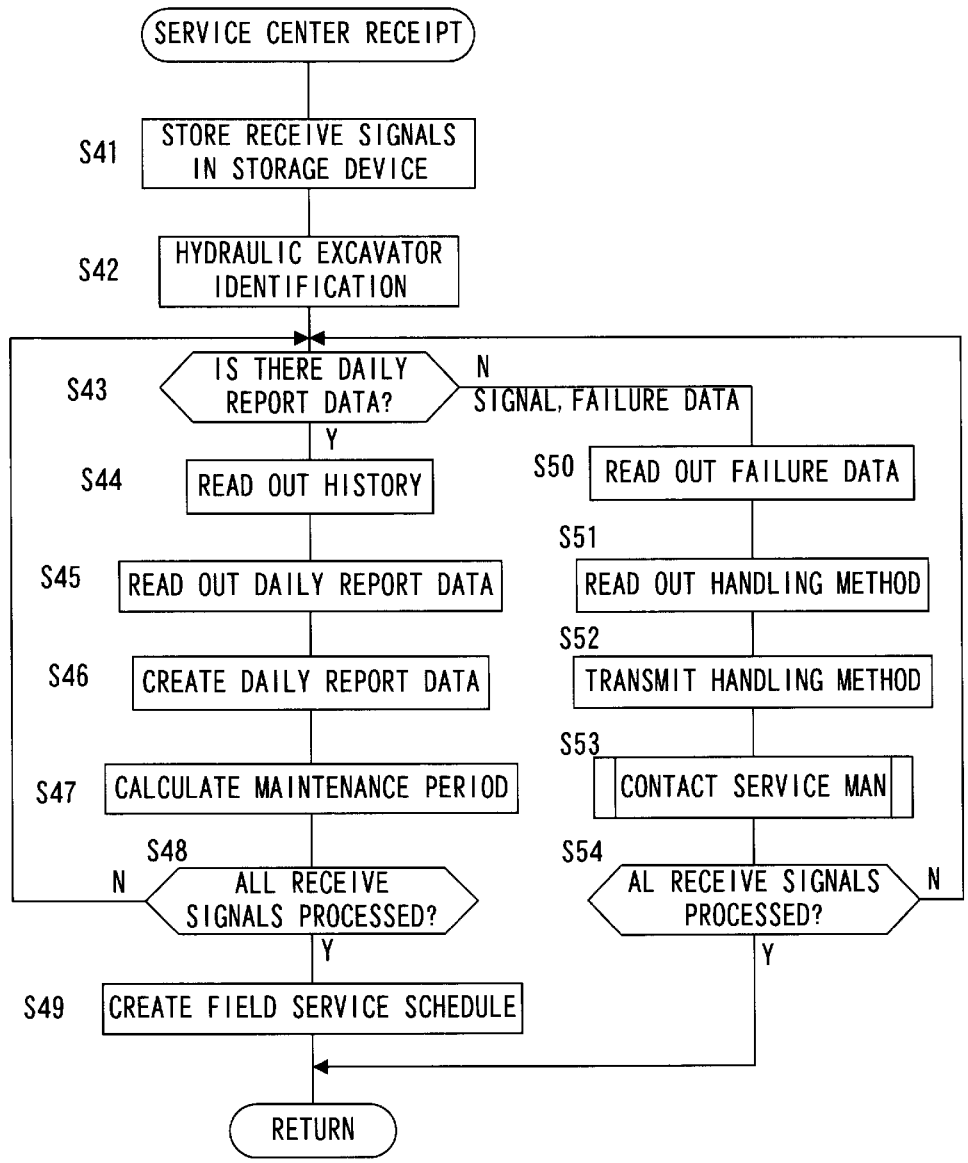
FIG. 16 is a flowchart showing an example of processing flow at the service center.

FIG. 16 is a flowchart showing a procedure for various processes executed by the processor 43, based on condition signals, alarm signals and failure signals received by the service center. If condition signals, alarm signals and failure signals are received, the processor 43 of the service center starts the program shown in FIG. 16. In step S41, received condition signals, alarm signals and failure signals are stored in the storage device 42. In step S42, a hydraulic excavator is identified from an identifier HD of the received signal. If received signals are for a plurality of hydraulic excavators, respective hydraulic excavators are identified and received signals are arranged in a suitable order.

In step S43, it is judged for a first hydraulic excavator whether the received signal is daily report data, alarm signal data or a failure signal. If it is daily report data, then in step S44 the database 47 is accessed using an identifier for the identified hydraulic excavator, and previous history is read out for the relevant hydraulic excavator. In step S45, daily report data is read out from the storage device 42, and a daily report such as is shown in FIG. 18 is created in step S46. A daily report will be described in more detail later. In step S47, the next maintenance period is calculated based on the daily report data and previous maintenance history read out from the database 47. After that, if it is judged in step S48 that processing has not been completed for all received signals for the hydraulic excavator, processing returns to step S43 and the same processing is carried out for receive signals for the next hydraulic excavator. If it is judged in step S48 that processing for all received signals has been completed, processing advances to step S49, and a field service schedule is created. A method of creating this schedule will be described later.

If it is judged in step S43 that received signals are alarm signals or failure signals, processing advances to step S50, and alarm signals or failure signals are read out from the storage device S42. In step S51, a handling method for the read out alarm signals or failure signals is read out from the database 47. In step S52, the read out handling method is transmitted to the relevant hydraulic excavator through the base station BC or through a mobile communication system. A telephone number of the hydraulic excavator is stored in advance in the storage device 42 of the service center. An identifier for identifying a hydraulic excavator is provided in a header of data transmitted to the hydraulic excavator, and data for displaying a handling method is provided following this identifier. After data transmission, processing for dispatching a service man to a work site is executed in step S53. If it is then judged in step S54 that processing of received signals for all hydraulic excavators has not been completed, processing returns to step S43, and the same processing is repeated. If it is judged that processing of received signals for all hydraulic excavators has been completed, this process terminates.

Figure 17:
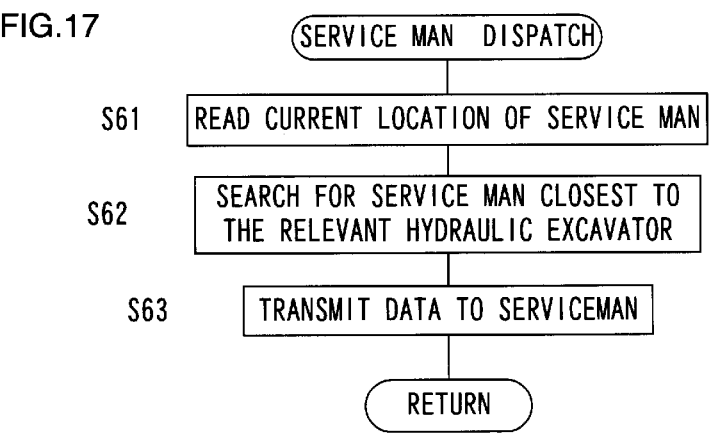
FIG. 17 is a flowchart showing an example of processing flow at the service center.

FIG. 17 is a flowchart showing processing flow for dispatching a service man executed in step S53 in FIG. 16. For example, all service men are made to carry a GPS receiver, and a current position signal transmitted to the service center at specified time intervals is stored in the storage device 42 of the service center. In step S61 of FIG. 17, current positions for all service men are read out from the storage device 42, and in step S62 the service man who is closest to the work site of the relevant hydraulic excavator is searched for. Processing then advances to step S63, and the relevant hydraulic excavator, work site, content of alarm or failure, failure handling method, and components to be taken are transmitted to the portable information terminal 51 for that service man via the base station BC, or via a mobile communication system. It is possible to make a service man's operation schedule into a database (refer to FIG. 22) and to search for a service man who has free time. At this time, it is also possible to automatically contact a parts control department to order parts.

FIG. 18 shows one example of daily report data created based on condition signals (daily report data) received by the service center. A daily report is created daily for each hydraulic excavator, and FIG. 18 is a daily report for, for example, Mar. 16, 2000 for machine No. 253 owned by Company A. The first page shows accumulated time for actual engine operation time, travel operation time, swiveling operation time, and front operation time, and times relating to work carried out on March 16. Page 2 shows maintenance information, for example, parts to be maintained and times for each part, such as 100 hours until engine oil filter replacement, and 60 hours until engine oil replacement.

This daily report is distributed to each service man by printing out at the service center. The daily report can also be distributed to service men by electronic mail. The daily report shown in FIG. 18 can be transmitted to hydraulic excavator No. 253 for display on the driver's seat monitor 25, or transmitted to the management section of company A, being a user.

A description will now be given of creating the field service schedule in step S49 shown in FIG. 16. FIG. 19A–FIG. 19C are figures showing one example of a maintenance schedule table. FIG. 19A shows a maintenance schedule for a traveling roller, FIG. 19B shows a maintenance schedule for a bush, and FIG. 19C shows a maintenance schedule for a pin. Accumulated time for actual engine operating time, travel operation time, swiveling operation time and front operation time for each hydraulic excavator is transmitted to the service center as condition signals (daily report data), and so a decision as to whether a replacement period for each component has been reached is made based on the actual engine operating time and each of the operation times.

For example, if the recommended replacement time for the travel roller is 2000 hours, then if the operation time for the travel roller of the hydraulic excavator a1 up to now reaches 1850 hours, there is then less than 150 hours until replacement, and it is judged that it is time for maintenance, and field service for the hydraulic excavator a1 is scheduled for within 150 hours. In FIG. 19A the hydraulic excavator a1 is displayed in the maintenance schedule for this month. Other number machines are handled in the same way.

If the recommended replacement time for a bush provided in the rotating axis of the boom is 3000 hours, then if the actual front operation time for the hydraulic excavator a2 at the same site up to now reaches 2950 hours, there is then less than 50 hours until replacement, it is judged that it is time for maintenance, and field service for the hydraulic excavator a2 is scheduled for within 50 hours. In FIG. 19B the hydraulic excavator a2 is displayed in the maintenance schedule for this month. Other number machines are handled in the same way.

Further, if the recommended replacement time for a pin provided in the rotating axis of the bucket is 4000 hours, then if the actual front operation time for the hydraulic excavator a6 at the same site up to now reaches 3920 hours, there is then less than 80 hours until replacement, it is judged that it is time for maintenance, and field service for the hydraulic excavator a3 is scheduled for within 80 hours. In FIG. 19C the hydraulic excavator a6 is displayed in the maintenance schedule for this month. Other number machines are handled in the same way.

A maintenance schedule chart as shown in FIG. 19 is created by calculating maintenance periods for hydraulic excavators a1–an operating at site A, hydraulic excavators b1–bn operating at site B, and hydraulic excavators c1–cn operating at site C. The sites A–C are under the same service center administration.

Components that require maintenance can be found using the maintenance schedule chart shown in FIG. 19. It is therefore possible to arrange to have parts in stock based on this schedule chart. In this particular case, the acquisition of parts is completed by automatically sending parts orders to a parts center affiliated with the service center, via an in-house intranet. It is also possible to calculate the maintenance cost using the schedule chart and the parts acquisition, and notify the user of the cost.

When creating the maintenance schedule shown in FIG. 19, a maintenance period is calculated by comparing usage time of the component in question up to the present with a standard usage time that is set in advance. However, for a hydraulic excavator the usage load conditions vary significantly depending on the work site and the nature of the job. For this reason it is preferable to vary the maintenance period according to load conditions.

In order to calculate the load conditions, traveling load frequency distribution and front (excavation) load frequency distribution are displayed as bar graphs based on daily report data transmitted every day from the hydraulic excavator, as shown in FIG. 20A and FIG. 20B. A reference traveling load frequency distribution and digging load frequency distribution are also set in advance. The calculated load frequency distribution is then compared to the reference load frequency distribution to determine whether the machine is being operated under a light load or a heavy load, and the maintenance period is calculated according to the following equations depending on the result of determination.

Maintenance period under heavy load=standard maintenance period×$\alpha$.

Maintenance period under light load=standard maintenance period×$\beta$.

It is noted that $\alpha$ is a value less than 1,$\beta$ is a value greater than 1, and they are determined in advance by experimentation or the like.

In calculation of the maintenance period described above, if the component in question is a travel roller, for example, the maintenance period is calculated by considering whether the travel load frequency distribution is a heavy load or a light load. And, if the component in question is a bush, the maintenance period is calculated by considering whether the excavation load frequency distribution is a heavy load or a light load. Specifically, the maintenance period is varied taking into consideration the load frequency distribution related to the component in question.

Instead of calculating the maintenance period according to the load using the method described above, it is also possible to provide heavy load maintenance periods, standard load maintenance periods and light load maintenance periods in advance as tables, and to select a table to be used depending on the load.

It is also possible to read out a previous maintenance condition history from the database 47 of the service center SF and to vary the maintenance period according to that history. Specifically, if the previous maintenance period is shorter or longer than the standard maintenance period, the previous maintenance period is changed by the current maintenance period and the maintenance period is calculated.

Figure 21:
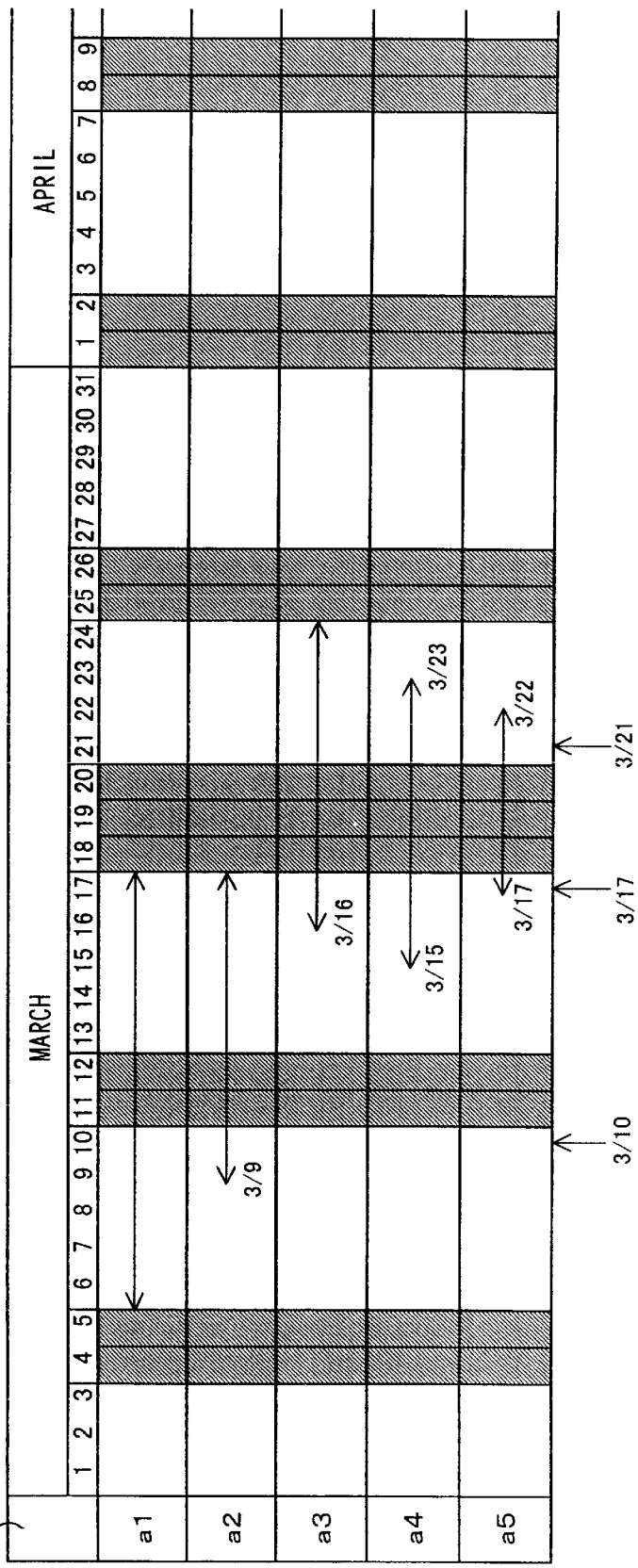
FIG. 21 is a figure for describing a schedule for carrying out efficient field service.

A description will now be given of a method for allowing a single service man to more efficiently visit a number of work sites. FIG. 21 shows a maintenance schedule chart for hydraulic excavators a1–a5 actually operating at a work site A. This maintenance schedule chart is calculated by the processor 43 at the service center. The hydraulic excavator a1 has maintenance scheduled for the period March 6 to March 17, the hydraulic excavator a2 has maintenance scheduled for the period March 9 to March 17, the hydraulic excavator a3 has maintenance scheduled for the period March 16 to March 24, the hydraulic excavator a4 has maintenance scheduled for the period March 15 to March 23, and the hydraulic excavator a5 has maintenance scheduled for the period March 17 to March 22. Setting of the maintenance schedules is done by, for example, estimating a replacement time from the time remaining until maintenance and the average daily operating time for the hydraulic excavator in question.

As will be understood from FIG. 21, if work site A is visited on March 10, maintenance for the two hydraulic excavators a1 and a2 can be carried out at the same time. If the work site is visited on March 17, maintenance for five hydraulic excavators a1–a5 can be carried out at the same time. If the work site is visited on March 21, maintenance for three hydraulic excavators a3–a5 can be carried out at the same time. What this means is that if the site is visited on March 17, maintenance operation can be completed more efficiently with fewer visits. In addition to the maintenance schedule for each numbered machine in FIG. 21, if a final maintenance schedule is created also taking into consideration the service man's schedule shown in FIG. 22, it is possible to create a maintenance schedule that is very precise and reflects whether or not the service man can make a visit.

In this way, a much more efficient method of carrying out field servicing is calculated by the processor 43. In FIG. 21 a description has been given for hydraulic excavators a1–a5 at work site A. However, it is also easy to calculate a more efficient field service schedule for hydraulic excavators at two or more different work sites. For example, the number of times the same work site is visited should be reduced, and a number of work sites should be visited taking the shortest route.

In the flowchart of FIG. 16, when signals received at the service center include alarm signals and failure signals, in steps S50–S54 a handling method is read out from the database 47 and transmitted to the hydraulic excavator. However, depending on the nature of the alarm or the failure, it may not be necessary to notify the operator. For example, if there is an abnormality with the EEPROM or ROM inside the controller 20 of the hydraulic excavator, there is no point notifying the operator, and in fact it would only cause greater confusion. It is therefore preferable to determine the necessity of transmitting a handling method to the hydraulic excavator according to the nature of the alarm or failure. Contents of the alarm or failure that do not need to be transmitted to the hydraulic excavator should be notified to only a service man.

In the flowchart of FIG. 16, when signals received at the service center include alarm signals and failure signals, in steps S50–S54 a handling method is read out from the database 47 and transmitted to the hydraulic excavator. However, in the event of a failure that requires immediate stopping of a machine, it may be preferable to transmit a signal to stop the engine to the hydraulic excavator instead of transmitting a handling method. In this case, a message such as "Engine will be automatically stopped. Please do not restart the engine until the service man arrives." is displayed on the driver's seat monitor 25. A signal to display the message is therefore transmitted at the same time as the engine stop signal. Alternatively, it is also possible to transmit a signal to cause the boom cylinder C1 to be lowered to automatically drive the machine so that it is put in a safe state.

In the above description, a handling method is read out from the database 47 of the service center based on alarm signals and failure signals. However, in the case of transmitting a plurality of types of failure signal at the same time, situations can be expected where it will not be possible to calculate a handing method using a combination of failure signals. For that reason, it is possible to connect an AI (artificial intelligence) device to the processor 43 of the service center and to obtain a handling method by reasoning from the content of the handling based on alarm signals and failure signals.

Also, in the above description, condition signals (daily report data) are transmitted at a fixed and regular time late at night. However, it is also possible to provide a switch for daily report data transmission in the driver's seat and to transmit the daily report data when this transmission switch is turned on. Alternatively, it is also possible to transmit the daily report data when the engine is stopped or started.

Figure 23A:
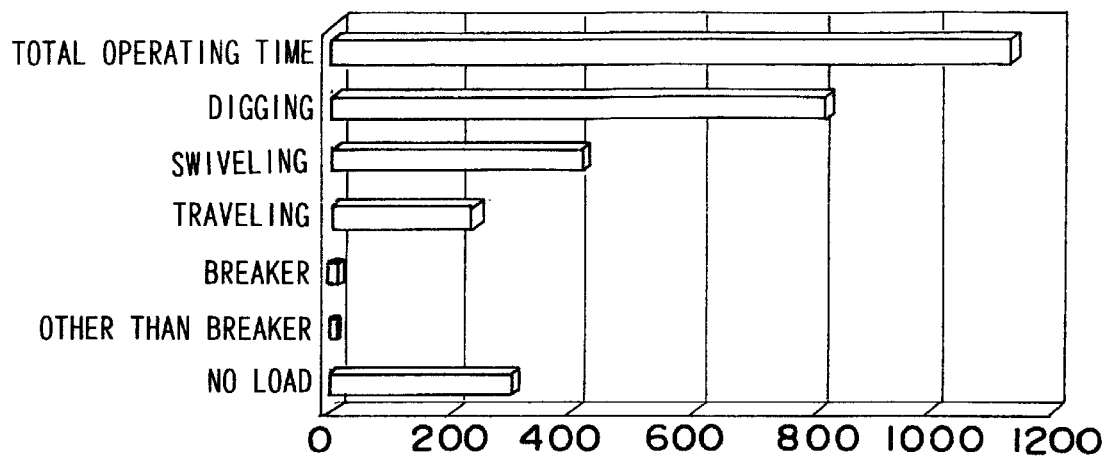
FIGS. 23A and 23B are figures showing engine operating time distribution.
Figure 23B:
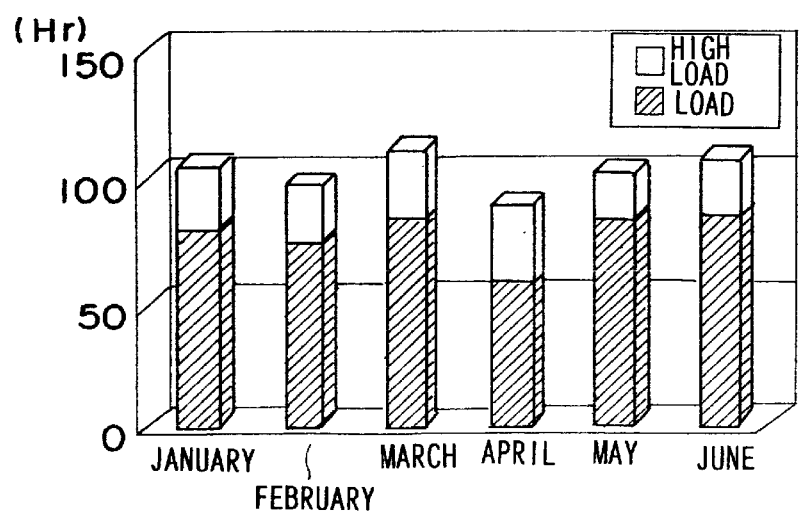

In the description above, a daily report shown in FIG. 18 is created based on the daily report data. However, as shown in FIGS. 23A and 23B it is possible to create a daily report containing actual engine operating time distribution. FIG. 23A is a bar graph respectively showing accumulated times for total operating time, excavation time, swiveling time, traveling time, breaker time, drive times for attachments other than a breaker, and no-load time. These accumulated times are represented by a bar graph created at the service center based on actual operating times for each day transmitted from the controller 20 of the hydraulic excavator. FIG. 23B is a bar graph showing actual engine operating time and idle time for each month. The actual engine operating time and idle time for each month are also represented by a bar graph created at the service center based on actual operating times for each day transmitted from the controller 20 of the hydraulic excavator.

As described above, a residual fuel amount sensor 15$f$ is mounted in the hydraulic excavator. Accordingly, it is also possible for the controller 20 to calculate fuel consumption and fuel consumption rate per unit time using a signal from the residual fuel amount sensor 15$f$. If the fuel consumption amount and fuel consumption rate is transmitted to the hydraulic excavator as daily report data, it is possible to give a visual representation of fuel consumption amount and fuel consumption rate at the service center.

For example, it is possible to output calculated fuel consumption amount per hour, amount of fuel consumed during actual operation, amount of fuel consumed while in standby, and total amount of fuel consumed over six months and output them in the form of a daily report. The amount of fuel consumed per hour is calculated by dividing amount of fuel consumed in one day by actual engine operating time for one day. The amount of fuel consumed during actual operation is the amount of fuel consumed while actually performing operations, and the amount of fuel consumed in standby is the amount of fuel consumed while the engine is being driven under no load conditions. The total amount of fuel consumed over a six month period is an accumulated value of fuel consumed literally over a six month period. Also, if the amount of fuel consumed in standby is greater than a reference value set in advance, a message such as "In order to reduce the amount of fuel consumed in standby mode, please bear in mind energy conservation when driving." is output.

Figure 24:
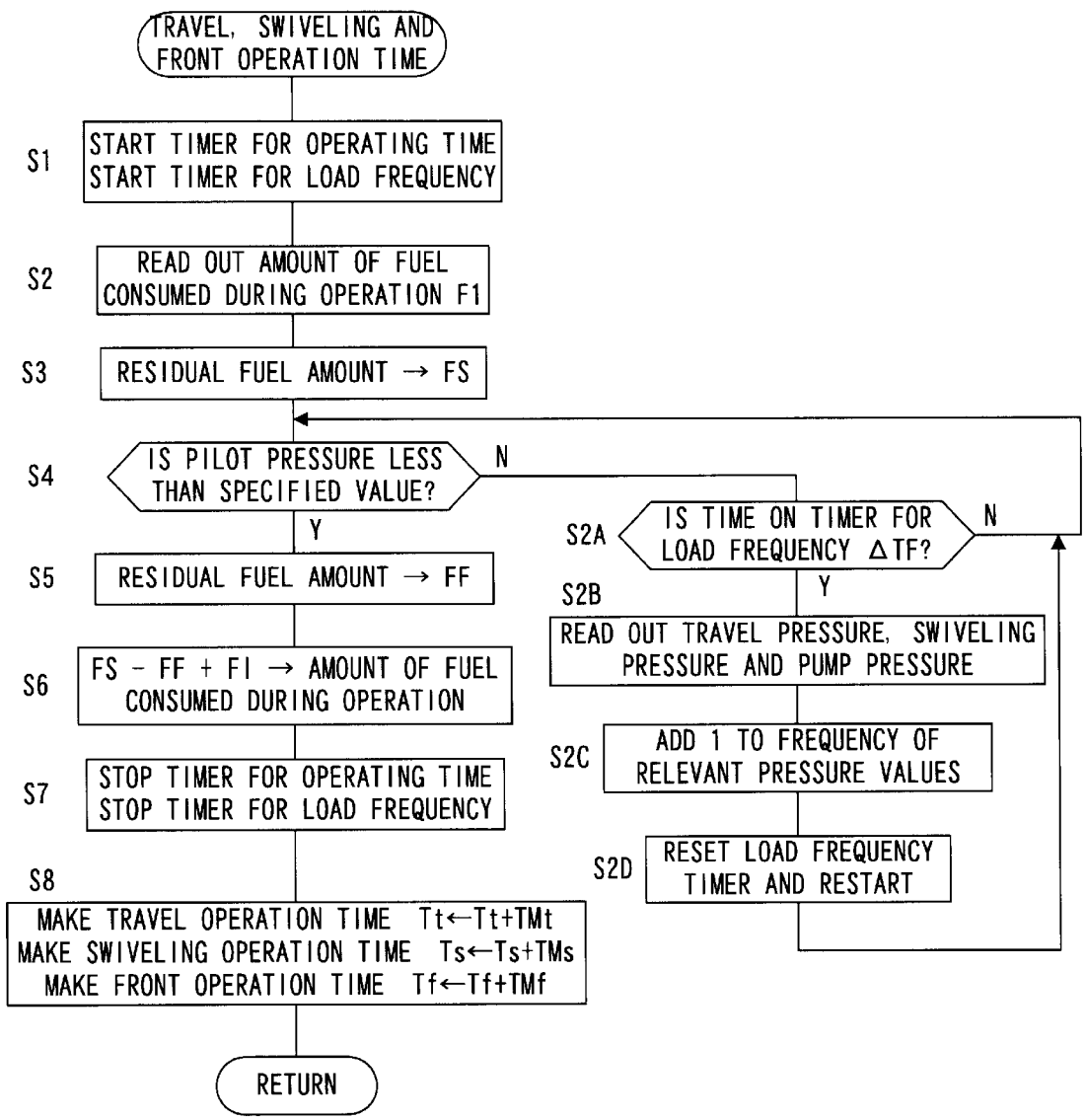
FIG. 24 is a flowchart showing processing flow for calculating travel operation time and fuel consumption when in operation.

In order to calculate the amount of fuel consumed during actual operation it is necessary to make operating conditions and fuel consumption correspond to each other. For example, as shown in FIG. 24, amount of fuel consumed is calculated during the processing of FIG. 7 for calculating travel operation time, swiveling operation time, and front operation time. If pilot pressure for traveling, swiveling or excavating become higher than a specified value, that is, if respective operations start, an amount of fuel consumed during actual operation FI is read out in step S5, and a measurement value from the residual fuel amount sensor 15f is read out in step S6 and substituted in for variable FS. If pilot pressure is less than a specified value, that is, if the respective operations described above are completed, processing advances to step S7 and a measurement value from the residual fuel amount sensor 15f is read out and substituted in for variable FF. In step SB, FS−FS+FI is calculated and the fuel amount consumed during actual operation FI is updated. Besides this, it is also possible to process information relating to fuel from various points of view and make it into a daily report.

In the above description, signals from the hydraulic excavators a1–cn are transmitted to the base station BC via a communications satellite CS, and signals are transmitted from the base station BC to the service center SF via a general public telephone network. However, it is also possible to transmit signals to the hydraulic excavators through a mobile communication system such as PHS telephone or cellular phone (portable telephone), without using the communications satellite. Also, signals from the hydraulic excavators are processed and output in various forms at the service center, but it is also possible to transmit the signals to a facility of the manager of the hydraulic excavator (a manufacturer's service center or a user's management department) where various information processing and output is performed in the same manner. In this case, if an ID card reader is installed in the hydraulic excavator, it can also be used in management of the operators working hours. Specifically, when an operator starts work, the operator set his own ID card on the IC card reader to be read. This information is transmitted to a facility of the hydraulic excavator owner, such as a personnel department, together with engine start time and stop time of the daily report data. In the personnel department, the operators working hours are managed based on the transmitted ID information and engine start time and stop time, and can also be used in calculating wages. Alternatively, it is also possible to calculate the amount of work an operator has done, for example, how much land has been excavated, based on the daily report data.

It is also possible to replace a hydraulic excavator manager with a rental company.

When a failure handling method is transmitted to a service man, a machine number, current operating location, nature of a failure, handling method, and parts to be brought etc. for the hydraulic excavator are grouped together and transmitted, but it is also possible to search a route map from a point where a service man is to the current operating location of the hydraulic excavator at the service center and transmit together with the route map.

It is possible to mount a navigation system in a serviceman's car, and then at the service station search for an optimum route from the point where the service man is to the current operating location of the hydraulic excavator, and to provide route guidance on a monitor of the navigation system in accordance with the searched results. Route searching can also be performed by the navigation system.

In the above description, alarm signals and failure signals detected by a sensor group 10 of a hydraulic excavator are transmitted to a service center, the nature of the failure is determined at the service center, and a method of handling that failure is calculated. However, it is also possible to determine the nature of the failure in the controller 20 of the hydraulic excavator based on alarm signals and failure signals, to transmit a code representing the nature of the failure, for example an abnormality flag or abnormality code, to the service center, and to then obtain a handling method by searching a database at the service center using the abnormality flag or abnormality code.

In the above description, condition signals for the hydraulic excavator are transmitted to the service station via a communications satellite CS and a base station BC, but it is also possible to transmit signals from the communications satellite directly to the service station.

Figure 25:
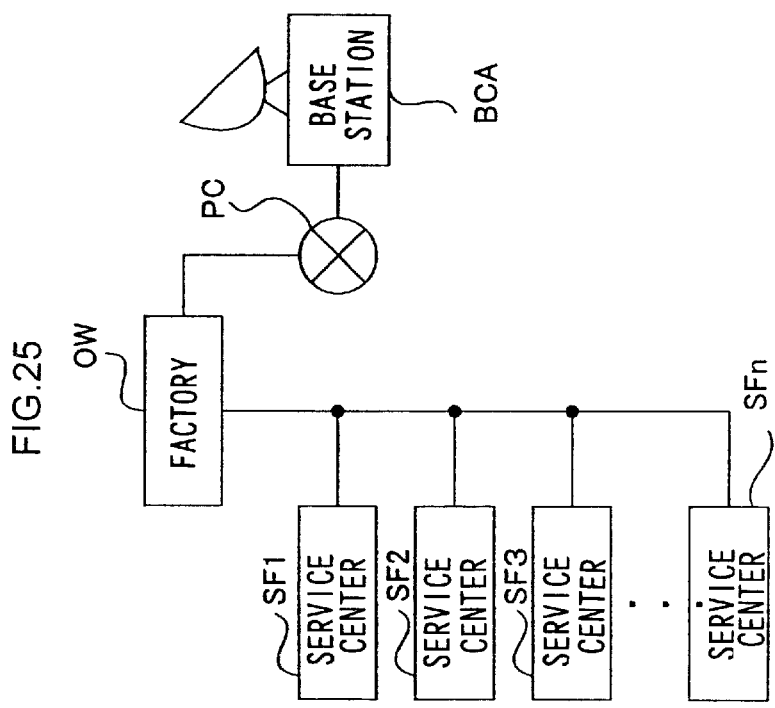
FIG. 25 is a figure showing another example of connecting a radio base station, a hydraulic excavator factory and a service center with a communications line.

Alternatively, as shown in FIG. 25, it is possible to connect a hydraulic excavator factory OW with a wireless base station BCA through a general public telephone network PC, and to connect the hydraulic excavator factory OW to a plurality of service centers SF1–SFn through a dedicated circuit (intranet). In this case, the base station BCA in FIG. 25 is a base station of a contractor or company providing a satellite communication service using a satellite, for example. Accordingly, as shown in FIG. 26, a system that is the same as the system inside the wireless base station BC shown in FIG. 11 is provided in the hydraulic excavator factory OW.

Figure 26:
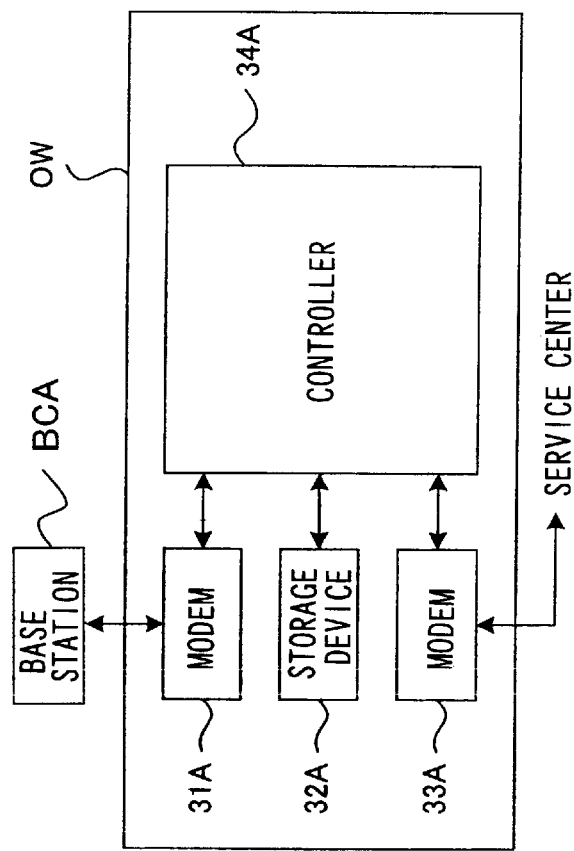
FIG. 26 is a figure showing the system structure inside a hydraulic excavator factory.

In FIG. 26, the factory OW comprises a modem 31A for receiving signals transmitted from a communications satellite CS via the wireless base station BCA and a general public telephone network, a storage device 32A for storing signals received by the modem 31A, a modem 33A for transmission of data to be transmitted to the service center through a dedicated line, and a controller 34A for controlling these various devices. The same processing as in FIG. 12 is then executed by the controller 34A. It is also possible to provide the function of the hydraulic excavator factory OW in a head office facility of a company manufacturing the hydraulic excavator or in the above described rental company.

Figure 27:
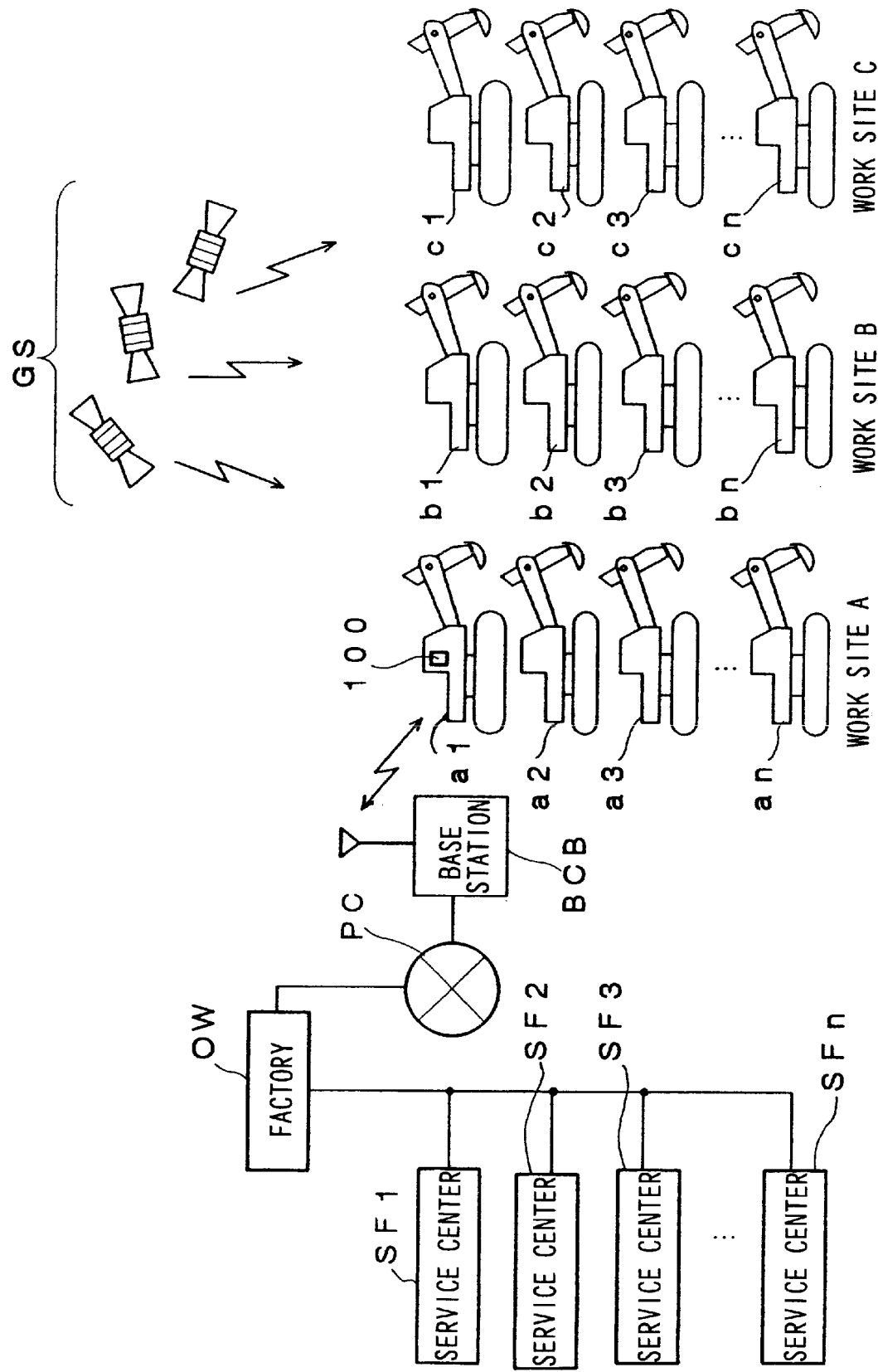
FIG. 27 is a figure showing an example of communication with hydraulic excavators using cellular phones.

Instead of using the satellite communication system, it is also possible to use a mobile communication system such as PHS telephone or cellular phone. FIG. 27 is a figure showing this aspect. The base station BCB is a base station of a cellular phone carrier. A cellular phone (portable telephone) 100 is mounted in each hydraulic excavator. In this case, it is possible to specify the position of each hydraulic excavator using positional information provided by a cellular phone system.

Description has been given with hydraulic excavators as an example, but the present invention can also be widely applied to working machines including construction machines other than hydraulic excavators and other working vehicles.

In the embodiment described above, an example has been described of a service center SF for recognizing which of work sites A, B and C each hydraulic excavator is actually operating at based-on current position information transmitted from each hydraulic excavator.

This positional information is calculated by the hydraulic excavator receiving GPS signals using a GPS receiver 24. However, it is also possible to put hydraulic excavators that have a certain distance or positional relationship into a group, based on current location information transmitted from each hydraulic excavator, without specially providing the work sites A, B and C in advance.

For example, a hydraulic excavator is designated to be one vehicle, and a specified number of hydraulic excavators in order closest to that designated hydraulic excavator are put into a single group. By repeating this processing, a plurality of hydraulic excavators can all be put into groups. Various methods of grouping can be considered, and it is possible to adopt all methods in the present invention. It is possible to then create a very efficient field service schedule based on these groupings. It is also possible to create an overall optimum field service schedule based on current location information for individual hydraulic excavators without grouping.

With the embodiment described above, an example has been described where a service man who will go and perform the field service acquires information related to a failure using a portable information terminal 51. It is also possible to use a cellular phone instead of this portable information terminal 51. In this case, the processor 43, for example, transmits data so as to display a failure checklist etc. in a display portion of the cellular phone using a cellular phone system (mobile communication system) The failure checklist is for listing items that are to be checked by the service man when a work machine develops a failure. The serviceman performs checks while confirming the checklist displayed on the cellular phone, and operates keys of the cellular phone to perform input corresponding to the checklist. Conditions of respective parts, failure information and replacement part information is also input. Input information is transmitted to the processor 43 via the cellular phone system. The processor 43 receives information transmitted via the cellular phone system, and stores it in a storage device 42 and database 47 as information related to a failure. The processor 43 receives information transmitted via the cellular phone system, and stores it in a storage device 42 and database 47 as information related to a failure. The processor 43 can be connected to the cellular phone system in a configuration similar to that in FIG. 27 mentioned before. If a cellular phone is used in this way, it is possible to simply make high level failure information, which can not be obtained with a sensor, into a database with simple means.

The main advantages relating to the failure handling method output system of the above described embodiment will be outlined in the following. Since a method for handling failure exhibited by signals representing the condition of each part of a work machine, for example, is calculated and output, the nature of the failure and a handling method can be precisely ascertained. As a result, when a service man goes out to the site where the work machine is operating, it is possible to take the necessary parts and materials, enabling efficient servicing.

What is claimed is:

1. A method for outputting failure handling method, comprising:
    detecting conditions of each part of a working machine by a condition detector provided in the working machine;
    transmitting condition signals representing the detected conditions by a working machine side transmitter provided in the working machine;
    receiving the condition signals by a working machine monitoring side receiver provided in a working machine monitoring facility;
    calculating a handling method for a failure showed by the received condition signals, by a handling method calculating device provided in the working machine monitoring facility; and
    transmitting a handling signal representing the calculated handling method by a working machine monitoring side transmitter provided in the working machine monitoring facility.

2. A method for outputting failure handling method according to claim 1, wherein said handling signal is also transmitted to any of the working machine, a service man and a manager of the working machine, by the working machine monitoring side transmitter provided in the working machine monitoring facility.

3. A method for outputting failure handling method according to claim 2, wherein when said handling signal is transmitted to the service man, a current location of the working machine is transmitted together by the working machine monitoring side transmitter provided in the working machine monitoring facility.

4. A method for outputting failure handling method according to claim 1, wherein said handling signal is transmitted together with information identifying the working machine and information indicating a nature of the failure, by the working machine monitoring side transmitter provided in the working machine monitoring facility.

5. A method for outputting failure handling method according to claim 1, wherein transmission and reception of the condition signals, and transmission of the handling signal, are carried out via a communications satellite.

6. A method for outputting failure handling method according to claim 1, wherein transmission and reception of the condition signals, and transmission of the handling signal, are carried out via a mobile communications system.

7. A method for outputting failure handling method according to claim 1, further comprising receiving the transmitted handling signal by a working machine side receiver provided in the working machine.

8. A failure handling method output system comprising:
    a condition detector that is provided in a working machine and detects conditions of each part of the working machine;
    a working machine side transmitter that is provided in the working machine and transmits condition signals representing the conditions detected by said condition detector;
    a working machine monitoring side receiver that is provided in a working machine monitoring facility and receives the condition signals transmitted from said working machine side transmitter;
    a handling method calculating device that is provided in the working machine monitoring facility and calculates a handling method for a failure shown by the condition signals received by said working machine monitoring side receiver;
    a working machine monitoring side transmitter that is provided in the working machine monitoring facility and transmits a handling signal representing the calculated handling method; and
    a working machine side receiver that is provided in the working machine and receives the transmitted handling signal.

9. A failure handling method output system according to claim 8, further comprising a monitor that displays the handling method based on the handling signal received by said working machine side receiver.

10. A failure handling output system according to claim 8, wherein said handling method calculating device calculates the handling method by searching a database using the condition signals received by said working machine monitoring side receiver.

11. A failure handling method output device comprising:
    a receiver that receives condition signals representing conditions of each part of a working machine transmitted from the working machine;
    a handling method calculating device that calculates a handling method for a failure shown by the received condition signals; and a transmitter that transmits a handling signal representing the calculated handling method.

12. A failure handling method output device according to claim 11, wherein the transmitter transmits the handling signal representing the calculated handling method to the working machine.

13. A method for outputting failure handling method, comprising:
 receiving condition signals representing conditions of each part of a working machine transmitted from the working machine;
 calculating a handling method for a failure shown by the received condition signals; and
 transmitting a handling signal representing the calculated handling method.

14. A method for outputting failure handling method according to claim 13, wherein reception of the condition signals and transmission of the handling signal are carried out via a communications satellite.

15. A method for outputting failure handling method according to claim 13, wherein reception of the condition signals and transmission of the handling signal are carried out via a mobile communications system.

16. A method for outputting failure handling method according to claim 13, wherein the handling signal representing the calculated handling method is transmitted to the working machine.

17. A failure handling method output device for receiving condition signals representing conditions of each part of a working machine transmitted from the working machine, calculating a handling method for a failure shown by the received condition signals, and transmitting a handling signal representing the calculated handling method.

18. A failure handling method output device according to claim 17, wherein the handling signal representing the calculated handling method is transmitted to the working machine.

19. A failure information acquisition method, comprising:
 outputting information, relating to items to be checked when a failure occurs in a working machine, to a portable telephone terminal via a portable telephone system;
 receiving information, which has been input at the portable telephone terminal regarding the items to be checked, via the portable telephone system; and
 storing the received information in a storage device as failure information.

* * * * *